United States Patent
Suzuki et al.

(10) Patent No.: US 10,932,207 B2
(45) Date of Patent: Feb. 23, 2021

(54) TERMINAL APPARATUS, BASE STATION APPARATUS, COMMUNICATION METHOD, AND INTEGRATED CIRCUIT

(71) Applicants: Sharp Kabushiki Kaisha, Sakai (JP); FG Innovation Company Limited, New Territories (HK)

(72) Inventors: Shoichi Suzuki, Sakai (JP); Wataru Ouchi, Sakai (JP); Tomoki Yoshimura, Sakai (JP); Liqing Liu, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/484,565

(22) PCT Filed: Feb. 15, 2018

(86) PCT No.: PCT/JP2018/005323
§ 371 (c)(1),
(2) Date: Aug. 8, 2019

(87) PCT Pub. No.: WO2018/151230
PCT Pub. Date: Aug. 23, 2018

(65) Prior Publication Data
US 2020/0045650 A1    Feb. 6, 2020

(30) Foreign Application Priority Data
Feb. 20, 2017  (JP) .............................. JP2017-029042

(51) Int. Cl.
*H04W 76/18*    (2018.01)
*H04W 74/08*    (2009.01)
(Continued)

(52) U.S. Cl.
CPC ........... *H04W 52/36* (2013.01); *H04W 52/22* (2013.01); *H04W 74/0833* (2013.01);
(Continued)

(58) Field of Classification Search
CPC .. H04L 5/0007; H04W 52/36; H04W 52/325; H04W 72/0413; H04W 74/02;
(Continued)

(56) References Cited

U.S. PATENT DOCUMENTS

2015/0296525 A1* 10/2015 Kim .................. H04W 72/0413
                                                          370/329
2018/0110074 A1*  4/2018 Akkarakaran .... H04W 72/0413
2018/0205516 A1*  7/2018 Jung ..................... H04L 5/0007

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.
(Continued)

*Primary Examiner* — Harun Chowdhury
(74) *Attorney, Agent, or Firm* — Imperium Patent Works

(57) ABSTRACT

A terminal apparatus increments a transmit counter based on a failure of random access response reception or contention resolution, and receives information for indicating a higher layer parameter powerRampingStep(1) and information for indicating a higher layer parameter powerRampingStep(2). A transmit power for PRACH transmission in a first step of a 2 step contention based random access procedure is given based at least on the transmission counter and the higher layer parameter powerRampingStep(1), and a transmit power for PUSCH transmission in the first step of the 2 step contention based random access procedure is given based at least on the transmission counter and the higher layer parameter powerRampingStep(2).

8 Claims, 20 Drawing Sheets

(51) Int. Cl.
*H04W 52/36* (2009.01)
*H04W 76/11* (2018.01)
*H04W 76/27* (2018.01)
*H04W 52/22* (2009.01)
*H04W 80/08* (2009.01)

(52) U.S. Cl.
CPC ............ *H04W 76/11* (2018.02); *H04W 76/18* (2018.02); *H04W 76/27* (2018.02); *H04W 80/08* (2013.01)

(58) Field of Classification Search
CPC . H04W 74/08; H04W 74/0833; H04W 76/18; H04W 76/27; H04W 80/08
USPC .......................... 370/252, 328, 329; 455/450
See application file for complete search history.

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.

"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, pp. 1-507.

Nokia, "Motivation for new SI proposal: Enhancements to initial access and scheduling for low-latency LTE", RP-162295, RAN#74, Dec. 5-8, 2016, pp. 1-5.

"Correction of Random Access procedure," 3GPP Draft; R1-01-1260, 3rd Generation Partnership Project (3GPP), Mobile Competence Centre; 650, Route des Lucioles; F-06921 Sophia-Antipolis Cedex; France, vol. RAN WG1, No. Korea; 2001 1 125, Nov. 25, 2001, XP050095482 (5 pages).

Nokia Alcatel-Lucent Shanghai Bell: "Considerations on NR RACH procedures," 3GPP Draft; R2-168013 Considerations on NR RACH Procedures, 3rd Generation Partnership Project (3GPP), Mobile Competence Centre; 650, Route des Lucioles; F-06921 Sophia-Antipolis Cedex; France, vol. RAN WG2, No. Reno, USA; Nov. 14, 2016-Nov. 18, 2016 Nov. 13, 2016, XP051177720, Retrieved from the http://www.3gpp.org/ftp/Meetings_3GPP_SYNC/RAN2/Docs1 (5 pages).

Nokia et al: "NR Random Access Procedure," 3GPP Draft; RI-1702286 NR Random Access Procedure, 3rd Generation Partnership Project (3GPP), Mobile Competence Centre; 650, Route des Lucioles; F-06921 Sophia-Antipolis Cedex; France, vol. RAN WG1, No. Athens, Greece; Feb. 13, 2017-Feb. 17, 2017 Feb. 12, 2017, XP051209440, Retrieved from http://www.3gpp.org/ftp/Meetings_3GPP_Sync/RANI/Docs/ (4 pages).

Extended European Search Report dated Dec. 2, 2020 of the European Patent Office in foreign related application EP18754930.8 (10 pages).

\* cited by examiner

| EVENT | 4 STEP CONTENTION BASED RANDOM ACCESS PROCEDURE | 2 STEP CONTENTION BASED RANDOM ACCESS PROCEDURE | NON-CONTENTION BASED RANDOM ACCESS PROCEDURE |
|---|---|---|---|
| (i) INITIAL ACCESS | ENABLED | ENABLED | DISABLED |
| (ii) RRC CONNECTION REESTABLISHMENT | ENABLED | ENABLED | DISABLED |
| (iii) HANDOVER | ENABLED | ENABLED | ENABLED |
| (iv) DOWNLINK DATA ARRIVAL | ENABLED | DISABLED | ENABLED |
| (v) UPLINK DATA ARRIVAL | ENABLED | ENABLED | DISABLED |
| (vi) TIME ADJUSTMENT FOR STAG | DISABLED | DISABLED | ENABLED |

FIG. 10

| EVENT | 4 STEP CONTENTION BASED RANDOM ACCESS PROCEDURE | 2 STEP CONTENTION BASED RANDOM ACCESS PROCEDURE | NON-CONTENTION BASED RANDOM ACCESS PROCEDURE |
|---|---|---|---|
| (A) IN A CASE THAT RANDOM ACCESS PROCEDURE IS INITIATED BY RRC | ENABLED | ENABLED | ENABLED |
| (B) IN A CASE THAT RANDOM ACCESS PROCEDURE IS INITIATED BY MAC ITSELF | ENABLED | ENABLED | *DISABLED* |
| (C) IN A CASE THAT RANDOM ACCESS PROCEDURE IN PRIMARY CELL IS INITIATED BASED ON PDCCH ORDER | ENABLED | *DISABLED* | ENABLED |
| (D) IN A CASE THAT RANDOM ACCESS PROCEDURE IN SECONDARY CELL IS INITIATED BASED ON PDCCH ORDER | *DISABLED* | *DISABLED* | ENABLED |

FIG. 11

| RESOURCE SET FOR TRANSMISSION OF RANDOM ACCESS PREAMBLE | RANDOM ACCESS PREAMBLE INDEX | 4 STEP CONTENTION BASED RANDOM ACCESS PROCEDURE | 2 STEP CONTENTION BASED RANDOM ACCESS PROCEDURE |
|---|---|---|---|
| RESOURCE SET 1202 | 0 to 5 | - | - |
| | 6 to 20 | GROUP 1212A2 | GROUP 1212A2 |
| | 21 to 41 | GROUP 1212B2 | GROUP 1212B2 |
| | 42 to 63 | GROUP 1212C2 | GROUP 1212C2 |

FIG. 18

| RESOURCE SET FOR TRANSMISSION OF RANDOM ACCESS PREAMBLE | RANDOM ACCESS PREAMBLE INDEX | 4 STEP CONTENTION BASED RANDOM ACCESS PROCEDURE | 2 STEP CONTENTION BASED RANDOM ACCESS PROCEDURE |
|---|---|---|---|
| RESOURCE SET 1202 | 0 to 5 | - | - |
| | 6 to 20 | GROUP 1212A2' | GROUP 1212A2 |
| | 21 to 41 | GROUP 1212B2' | GROUP 1212B2 |
| | 42 to 63 | | |

FIG. 19

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2017-029042 filed on Feb. 20, 2017, the contents of which are incorporated herein by reference.

BACKGROUND ART

A radio access method and a radio network for cellular mobile communications (hereinafter referred to as "Long Term Evolution (LTE: Registered Trademark)", or "Evolved Universal Terrestrial Radio Access (EUTRA)") have been studied in the 3rd Generation Partnership Project (3GPP) (NPLs 1, 2, 3, 4, 5). Further, in 3GPP, a new radio access method (hereinafter referred to as "New Radio (NR)") is being studied. In LTE, a base station apparatus is also referred to as an evolved NodeB (eNodeB). In NR, the base station apparatus is also referred to as gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage a plurality of cells.

In NPL 6, it has been proposed to study a technique for reducing delay and/or overhead in an initial access procedure and a random access procedure (NPL 6).

CITATION LIST

Non Patent Literature

NPL 1: "3GPP TS 36.211 V13.0.0 (2015-12)", 6 Jan. 2016.
NPL 2: "3GPP TS 36.212 V13.0.0 (2015-12)", 6 Jan. 2016.
NPL 3: "3GPP TS 36.213 V13.0.0 (2015-12)", 6 Jan. 2016.
NPL 4: "3GPP TS 36.321 V13.0.0 (2015-12)", 14 Jan. 2016.
NPL 5: "3GPP TS 36.331 V13.0.0 (2015-12)", 7 Jan. 2016.
NPL 6: "Motivation for new SI proposal: Enhancements to initial access and scheduling for low-latency LTE", RP-162295, 5 Dec. 2016.

SUMMARY OF INVENTION

Technical Problem

An embodiment of the present invention provides a terminal apparatus capable of efficiently performing a random access to a base station apparatus, a base station apparatus communicating with the terminal apparatus, a communication method used for the terminal apparatus, a communication method used for the base station apparatus, an integrated circuit implemented on the terminal apparatus, and an integrated circuit implemented on the base station apparatus.

Solution to Problem (1) According to some aspects of the present invention, the following measures are provided. In other words, a first aspect of the present invention is a terminal apparatus which is a terminal apparatus including a higher layer processing unit configured to increment a transmission counter based on a failure of random access response reception or contention resolution, a receiver configured to receive information for indicating a higher layer parameter powerRampingStep(1) and information for indicating a higher layer parameter powerRampingStep(2), and a transmit power control unit configured to set a transmit power, wherein the transmit power for PRACH transmission in a first step of a 2 step contention based random access procedure is given based at least on the transmission counter and the higher layer parameter powerRampingStep(1), and the transmit power for PUSCH transmission in the first step of the 2 step contention based random access procedure is given based at least on the transmission counter and the higher layer parameter powerRampingStep(2).

(2) A second aspect of the present invention is a communication method used for a terminal apparatus, the communication method including the steps of incrementing a transmission counter based on a failure of random access response reception or contention resolution, receiving information for indicating a higher layer parameter powerRampingStep(1) and information for indicating a higher layer parameter powerRampingStep(2), and setting a transmit power, wherein the transmit power for PRACH transmission in a first step of a 2 step contention based random access procedure is given based at least on the transmission counter and the higher layer parameter powerRampingStep(1), and the transmit power for PUSCH transmission in the first step of the 2 step contention based random access procedure is given based at least on the transmission counter and the higher layer parameter powerRampingStep(2).

Advantageous Effects of Invention

According to one aspect of the present invention, a terminal apparatus and a base station apparatus can efficiently perform a random access procedure.

BRIEF DESCRIPTION OF DRAWINGS

FIG. 10 is a diagram illustrating one example of correspondence between events and forms of random access procedures according to the present embodiment.

FIG. 11 is a diagram illustrating another example of correspondence between events and forms of random access procedures according to the present embodiment.

FIG. 18 is a diagram illustrating one example of random access preamble groups for random access procedures according to the present embodiment.

FIG. 19 is a diagram illustrating another example of random access preamble groups for random access procedures according to the present embodiment.

DESCRIPTION OF EMBODIMENTS

Embodiments of the present invention will be described below.

Figure 1:
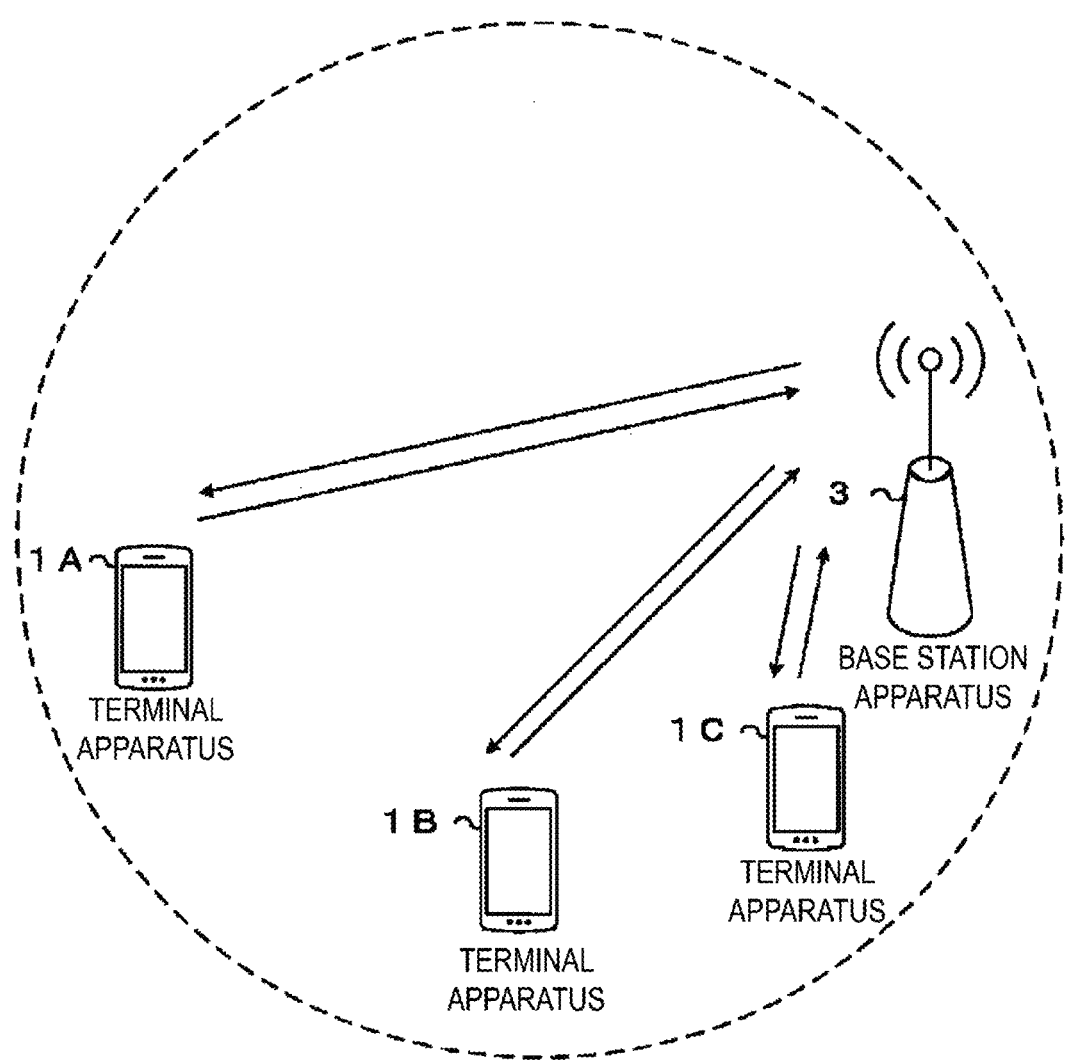
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1 and a base station apparatus 3. The base station apparatus 3 includes a source base station apparatus 3A, a target base station apparatus 3B, and a Mobility Management Entity (MME)/Gateway (GW). Uu are radio access links between the terminal apparatuses 1 and the base station apparatus 3. The Uu include uplinks from the terminal apparatuses 1 to the base station apparatus 3 and downlinks from the base station apparatus 3 to the terminal apparatuses 1. X2 is a backhaul link between the source base station apparatus 3A and the target base station apparatus 3B. S1 is a backhaul link between the source base station apparatus 3A/target base station apparatus 3B and the MME/GW.

The terminal apparatuses 1 may perform handover from the source base station apparatus 3A to the target base station apparatus 3B. The terminal apparatuses 1 may perform handover from a source cell to a target cell. The source cell may be managed by the source base station apparatus 3A. The target cell may be managed by the target base station apparatus 3B. The source base station apparatus 3A and the target base station apparatus 3B may be the same apparatus. In other words, the terminal apparatuses 1 may perform handover from the source cell managed by the source base station apparatus 3A to the target cell managed by the source base station apparatus 3A. The source cell is also referred to as a source primary cell. The target cell is also referred to as a target primary cell.

Hereinafter, carrier aggregation will be described.

In the present embodiment, one or more serving cells are configured for the terminal apparatus 1. A technology in which the terminal apparatus 1 communicates via the plurality of serving cells is referred to as cell aggregation or carrier aggregation. In the carrier aggregation, multiple configured serving cells are also referred to as aggregated serving cells.

Time Division Duplex (TDD) and/or Frequency Division Duplex (FDD) is applied to a radio communication system in the present embodiment. For cell aggregation, TDD may be applied to all multiple serving cells. Alternatively, serving cells to which TDD is applied and serving cells to which FDD is applied may be aggregated. In the present embodiment, the serving cells to which TDD is applied are also referred to as TDD serving cells.

The multiple configured serving cells include one primary cell and one or more secondary cells. The primary cell is a serving cell in which an initial connection establishment procedure has been performed, a serving cell in which a Radio Resource Control (RRC) connection re-establishment procedure has been initiated, or a cell indicated as a primary cell during a handover procedure. The secondary cell may be configured at a point of time when or after a Radio Resource Control (RRC) connection is established.

The primary cell may include a source primary cell and a target primary cell.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission of multiple physical channels/multiple physical signals in multiple aggregated serving cells (component carriers). The terminal apparatus 1 can perform simultaneous reception of multiple physical channels/multiple physical signals in multiple aggregated serving cells (component carriers).

In a case that Dual Connectivity (DC) is configured for a terminal apparatus, a Master Cell Group (MCG) is a subset of all serving cells, and a Secondary Cell Group (SCG) is a subset of serving cells that are not part of the MCG. In a case that DC is not configured for the terminal apparatus, the MCG includes all serving cells. The MCG includes a primary cell and zero or more secondary cells. The SCG includes a primary secondary cell and zero or more secondary cells.

The MCG may include one primary TAG and zero or more secondary TAGs. The SCG may include one primary TAG and zero or more secondary TAGs.

The Timing Advance Group (TAG) is a group of serving cells configured by Radio Resource Control (RRC). The same timing advance value is applied to serving cells included in the same TAG. The timing advance is used to adjust PUSCH/PUCCH/SRS/DMRS transmission timings in the serving cells. The primary TAG of the MCG may include a primary cell and zero or more secondary cells. The primary TAG of the SCG may include a primary secondary cell and zero or more secondary cells. The secondary TAG may include one or more secondary cells. The secondary TAG does not include a primary cell and a primary secondary cell.

Figure 2:
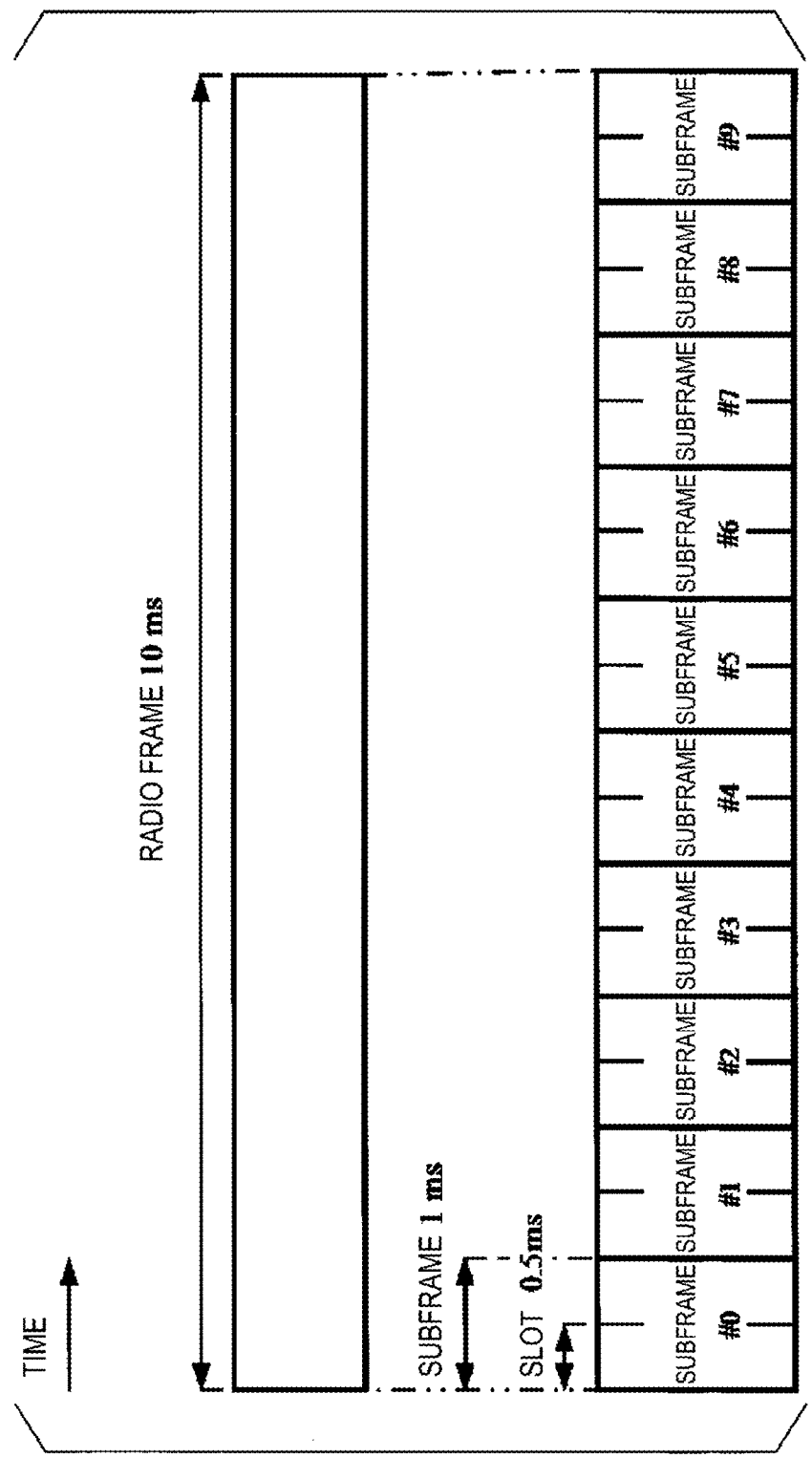
FIG. 2 is a diagram illustrating a schematic structure of a radio frame according to the present embodiment.

FIG. 2 is a diagram illustrating a schematic structure of a radio frame according to the present embodiment. In FIG. 2, the horizontal axis is a time axis.

Various field sizes in the time domain are expressed by the number of time units $T_s=1/(15000 \cdot 2048)$ seconds. The length of a radio frame is $T_f=307200 \cdot T_s=10$ ms (milliseconds). Each of radio frames includes ten contiguous subframes in the time domain. The length of each of the subframes is $T_{subframe}=30720 \cdot T_s=1$ ms. Each of subframes i includes two contiguous slots in the time domain. The two contiguous slots in the time domain comprise a slot having a slot number $n_s$ of 2i in the radio frame and a slot having a slot number $n_s$ of 2i+1 in the radio frame. The length of each of the slots is $T_{slot}=153600 \cdot n_s=0.5$ ms. Each of radio frames includes ten contiguous subframes in the time domain. Each of radio frames includes 20 contiguous slots ($n_s=0, 1, \ldots, 19$) in the time domain. A subframe is also referred to as a Transmission Time Interval (TTI).

Figure 3:
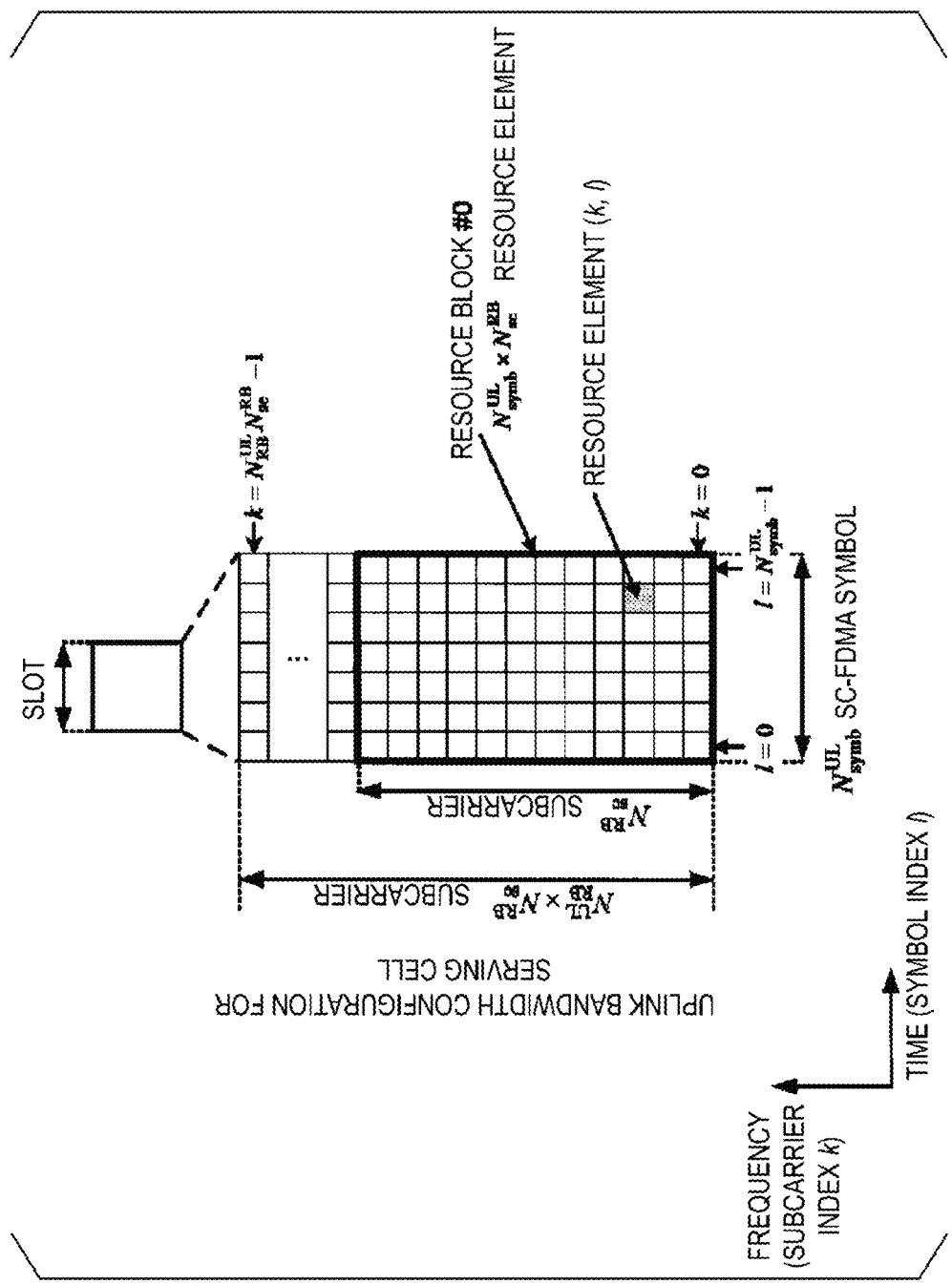
FIG. 3 is a diagram illustrating a schematic structure of an uplink slot according to the present embodiment.

A structure of a slot according to the present embodiment will be described below. FIG. 3 is a diagram illustrating a schematic structure of an uplink slot according to the present embodiment. FIG. 3 illustrates a structure of an uplink slot in one cell. In FIG. 3, the horizontal axis is a time axis, and the vertical axis is a frequency axis. In FIG. 3, 1 is a Single Carrier-Frequency Division Multiple Access (SC-FDMA) symbol number/index, and k is a subcarrier number/index.

The physical signal or the physical channel transmitted in each of the slots is expressed by a resource grid. In uplink, the resource grid is defined by multiple subcarriers and multiple SC-FDMA symbols. Each element within the resource grid is referred to as a resource element. The resource element is expressed by the subcarrier number/index k and the SC-FDMA symbol number/index 1. In the present embodiment, a resource refers to a frequency-time resource.

The resource grid is defined for each antenna port. In the present embodiment, description is given for one antenna port. The present embodiment may be applied to each of multiple antenna ports.

An uplink slot includes multiple SC-FDMA symbols 1 ($1=0, 1, \ldots, N^{UL}_{symb}$) in the time domain. $N^{UL}_{symb}$ indicates the number of SC-FDMA symbols included in one uplink slot. For a normal Cyclic Prefix (CP), $N^{UL}_{symb}$ is 7. For an extended Cyclic Prefix (CP), $N^{UL}_{symb}$ is 6.

The uplink slot includes multiple subcarriers k (k=0, 1, ..., $N^{UL}_{RB}*N^{RB}_{SC}$) in the frequency domain. $N^{UL}_{RB}$ is an uplink bandwidth configuration for a serving cell expressed by a multiple of $N^{RB}_{SC}$. $N^{RB}_{SC}$ is a (physical) resource block size in the frequency domain expressed by the number of subcarriers. In the present embodiment, a subcarrier interval $\Delta f$ is 15 kHz, and $N^{RB}_{SC}$ is a size of 12 subcarriers. In other words, in the present embodiment, $N^{RB}_{SC}$ is 180 kHz.

A resource block is used to express mapping of a physical channel to resource elements. For the resource block, a virtual resource block and a physical resource block are defined. The physical channel is first mapped to the virtual resource block. Thereafter, the virtual resource block is mapped to the physical resource block. One physical resource block is defined by $N^{UL}_{symb}$ consecutive SC-FDMA symbols in the time domain and $N^{RB}_{SC}$ consecutive subcarriers in the frequency domain. Hence, one physical resource block includes ($N^{UL}_{symb}*N^{RB}_{SC}$) resource elements. One physical resource block corresponds to one slot in the time domain. The physical resource blocks are numbered (0, 1, ..., $N^{UL}_{RB}-1$) in ascending order of frequencies in the frequency domain.

A downlink slot according to the present embodiment includes multiple OFDM symbols. Since the structure of the downlink slot according to the present embodiment is the same as the structure of the uplink slot except that the resource grid is defined by multiple subcarriers and multiple OFDM symbols, the description of the structure of the downlink slot will be omitted.

Physical channels and physical signals according to the present embodiment will be described.

In FIG. 1, in uplink radio communication from the terminal apparatus 1 to the base station apparatus 3, the following uplink physical channels are used. The uplink physical channels are used by a physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: downlink Channel State Information (CSI); a Scheduling Request (SR) used to request for a PUSCH (Uplink-Shared Channel: UL-SCH) resource for initial transmission; and a Hybrid Automatic Repeat request ACKnowledgement (HARQ-ACK) for downlink data (a Transport block, a Medium Access Control Protocol Data Unit (MAC PDU), a Downlink-Shared Channel (DL-SCH), or a Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The PUSCH is used for transmission of uplink data (UpLink-Shared CHannel (UL-SCH)). The PUSCH may be used to transmit the HARQ-ACK and/or channel state information along with the uplink data. Furthermore, the PUSCH may be used to transmit only the channel state information or to transmit only the HARQ-ACK and the channel state information. The PUSCH is used to transmit a random access message 3.

The PRACH is used to transmit a random access preamble (random access message 1). The PRACH is used for indicating the initial connection establishment procedure, the handover procedure, the connection re-establishment procedure, synchronization (timing adjustment) for uplink transmission, and the request for the PUSCH (UL-SCH) resource.

The random access preamble may be given by cyclic shifting a Zadoff-Chu sequence corresponding to a physical root sequence index u. The Zadoff-Chu sequence is generated based on the physical root sequence index u. In one cell, multiple random access preambles may be defined. The random access preamble may be determined by a random access preamble index. Different random access preambles corresponding to different random access preamble indexes correspond to different combinations of the physical root sequence index u and a cyclic shift. The physical root sequence index u and the cyclic shift may be given based at least on information included in system information.

A Zadoff-Chu sequence $x_u(n)$ corresponding to the physical root sequence index u is given by Equation 1, where e is the Napier's number, $N_{ZC}$ is the length of the Zadoff-Chu sequence $x_u(n)$, and n is an integer incremented from 0 to $N_{ZC}-1$.

$$x_u(n) = e^{-j\frac{\pi u n(n+1)}{N_{ZC}}}, 0 \le n \le N_{ZC}-1 \quad \text{Equation 1}$$

A random access preamble (random access preamble sequence) $x_{u,v}(n)$ is given by Equation 2. $C_v$ is a cyclic shift value. X mod Y is a function for outputting a remainder acquired by dividing X by Y.

$$x_{u,v}(n) = x_u((n+C_v) \bmod N_{ZC}) \quad \text{Equation 2}$$

In FIG. 1, the following uplink physical signal is used in the uplink radio communication. The uplink physical signal is not used for transmitting information output from the higher layer, but is used by the physical layer.

Uplink Reference Signal (UL RS)

According to the present embodiment, the following two types of uplink reference signals are used.

Demodulation reference signal (DMRS)

Sounding reference signal (SRS)

DMRS is associated with transmission of PUSCH or PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

SRS is not associated with the transmission of PUSCH or PUCCH. The base station apparatus 3 may use the SRS for measuring a channel state. The SRS is transmitted in the last SC-FDMA symbol in an uplink subframe or in an SC-FDMA symbol in a UpPTS.

In FIG. 1, the following downlink physical channels are used for downlink radio communication from the base station apparatus 3 to the terminal apparatus 1. The downlink physical channels are used by the physical layer for transmission of information output from the higher layer.

Physical broadcast channel (PBCH)

Physical control format indicator channel (PCFICH)

Physical hybrid automatic repeat request indicator channel (PHICH)

Physical downlink control channel (PDCCH)

Enhanced physical downlink control channel (EPDCCH)

Physical downlink shared channel (PDSCH)

Physical multicast channel (PMCH)

The PBCH is used for broadcasting a Master Information Block (MIB, a Broadcast CHannel (BCH)) that is commonly used by the terminal apparatuses 1. The MIB is transmitted at intervals of 40 ms, and, within the interval, the MIB is repeatedly transmitted every 10 ms. Specifically, initial transmission of the MIB is performed in a subframe 0 in a radio frame that satisfies SFN mod 4=0, and re-transmission (repetition) of the MIB is performed in subframes 0 in all the other radio frames. A system frame number (SFN) is a radio frame number. The MIB is system information. For example, the MIB includes information indicating the SFN.

The PCFICH is used for transmission of information indicating a region (OFDM symbols) to be used for transmission of the PDCCH.

The PHICH is used for transmission of a HARQ indicator for uplink data (UpLink-Shared CHannel (UL-SCH)) received by the base station apparatus 3. The HARQ indicator indicates a HARQ-ACK.

The PDCCH and the EPDCCH are used to transmit downlink control information (DCI). The downlink control information is also referred to as DCI format. The downlink control information includes a downlink grant and an uplink grant. The downlink grant is also referred to as a downlink assignment or a downlink allocation.

One downlink grant is used for the scheduling of one PDSCH within one serving cell. The downlink grant is used for the scheduling of the PDSCH within the same subframe as the subframe on which the downlink grant is transmitted.

One uplink grant is used for the scheduling of one PUSCH within one serving cell. The uplink grant is used for the scheduling of the PUSCH within the fourth or later subframe after the subframe in which the uplink grant is transmitted.

CRC parity bits added to a downlink grant or an uplink grant are scrambled with a Cell-Radio Network Temporary Identifier (C-RNTI), a Temporary C-RNTI, a Semi Persistent Scheduling (SPS) C-RNTI, or a Random Access-Radio Network Temporary Identifier (RA-RNTI). The C-RNTI and the SPS C-RNTI are identifiers for identifying a terminal apparatus within a cell. The Temporary C-RNTI is used during a contention based random access procedure. The RA-RNTI is used for the scheduling of a random access response. An uplink grant to which CRC parity bits scrambled with the RNTI are added is also referred to as an uplink grant for the RNTI or an uplink grant corresponding to the RNTI. The PDCCH including the uplink grant to which the CRC parity bits scrambled with the RNTI are added is also referred to as the PDCCH for the RNTI, the PDCCH corresponding to the RNTI, the PDCCH directed to the RNTI, or the PDCCH including the RNTI.

The C-RNTI is used to control the PDSCH or the PUSCH in one subframe. The terminal apparatus 1 may transmit the PUSCH including a transport block based on the detection of the PDCCH including an uplink grant to which CRC parity bits scrambled with the C-RNTI are added. The re-transmission of the transport block may be indicated by the PDCCH including the uplink grant to which the CRC parity bits scrambled with the C-RNTI are added.

The SPS C-RNTI is used to periodically allocate a resource for the PDSCH or the PUSCH. The terminal apparatus 1 detects the PDCCH including an uplink grant to which CRC parity bits scrambled with the SPS C-RNTI are added, and in a case that it is determined that the uplink grant is valid as an SPS activation command, the uplink grant is stored as a configured uplink grant. The MAC layer of the terminal apparatus 1 considers that the configured uplink grant is periodically generated. A subframe in which the configured uplink grant is considered to be generated is given by a first period and a first offset. The terminal apparatus 1 receives information for indicating the first period from the base station apparatus 3. The re-transmission of the transport block transmitted in the periodically allocated PUSCH is indicated by the uplink grant to which the CRC parity bits scrambled with the SPS C-RNTI are added. The configured uplink grant is also referred to as an uplink grant configured by Medium Access Control (MAC) or a first configured uplink grant.

The PDSCH is used to transmit downlink data (downlink shared channel (DL-SCH)). The PDSCH is used to transmit a random access message 2 (random access response). The PDSCH is used to transmit a handover command. The PDSCH is used to transmit system information including a parameter used for an initial access.

The PMCH is used to transmit multicast data (multicast channel (MCH)).

In FIG. 1, the following downlink physical signals are used for the downlink radio communication. The downlink physical signals are not used for transmission of information output from the higher layer, but are used by the physical layer.

Synchronization Signal (SS)

Downlink Reference Signal (DL RS)

The synchronization signal is used for the terminal apparatus 1 to take synchronization in the frequency domain and the time domain in the downlink. The synchronization signal includes a Primary Synchronization Signal (PSS) and a Second Synchronization Signal (SSS).

The downlink reference signal is used for the terminal apparatus 1 to perform channel compensation on a downlink physical channel. The downlink reference signal is used for the terminal apparatus 1 to calculate downlink channel state information.

According to the present embodiment, the following seven types of downlink reference signals are used.

Cell-specific reference signal (CRS)

UE-specific reference signal (URS) relating to the PDSCH

Demodulation reference signal (DMRS) relating to the EPDCCH

Non-zero power channel state information-reference signal (NZP CSI-RS)

Zero Power Channel State Information-Reference Signal (ZP CSI-RS)

Multimedia broadcast and multicast service over single frequency network reference signal (MBSFN RS)

Positioning reference signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The PUSCH and the PDSCH are used to transmit the RRC signaling and the MAC CE. Here, the RRC signaling transmitted from the base station apparatus 3 in the PDSCH may be signaling common to multiple terminal apparatuses 1 in a cell. The RRC signaling transmitted from the base station apparatus 3 in the PDSCH may be signaling dedicated to a certain terminal apparatus 1 (also referred to as dedicated signaling or UE specific signaling). A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1.

Configurations of apparatuses according to the present embodiment will be described below.

Figure 4:
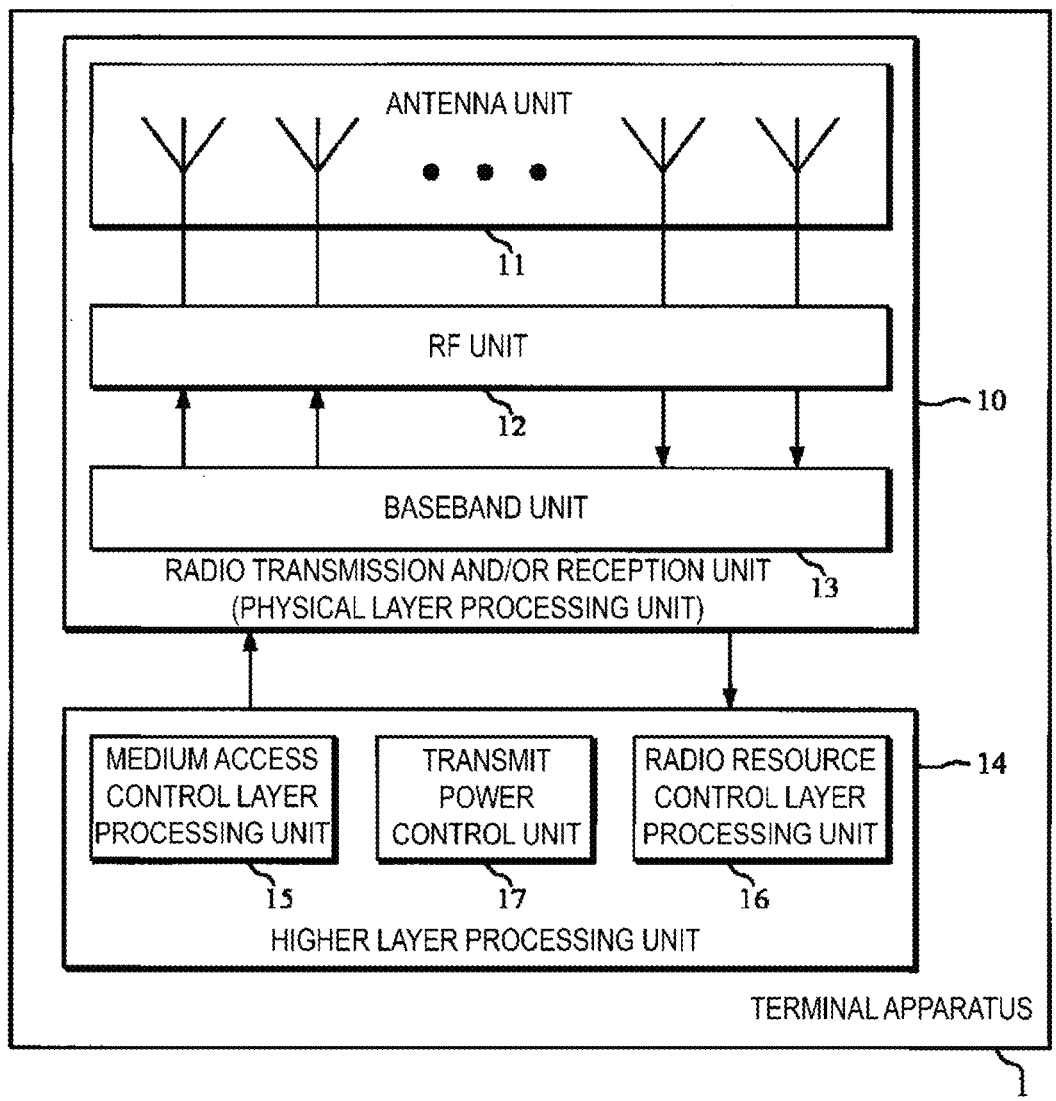
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of its own apparatus. The radio resource control layer processing unit 16 sets various types of configuration information/parameters based on higher layer signaling received from the base station apparatus 3. Namely, the radio resource control unit 16 sets the various configuration information/parameters in accordance with the information indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing an Inverse Fast Fourier Transform (IFFT) of the data, adds CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling transmit power. The RF unit 12 is also referred to as a transmit power control unit.

Figure 5:
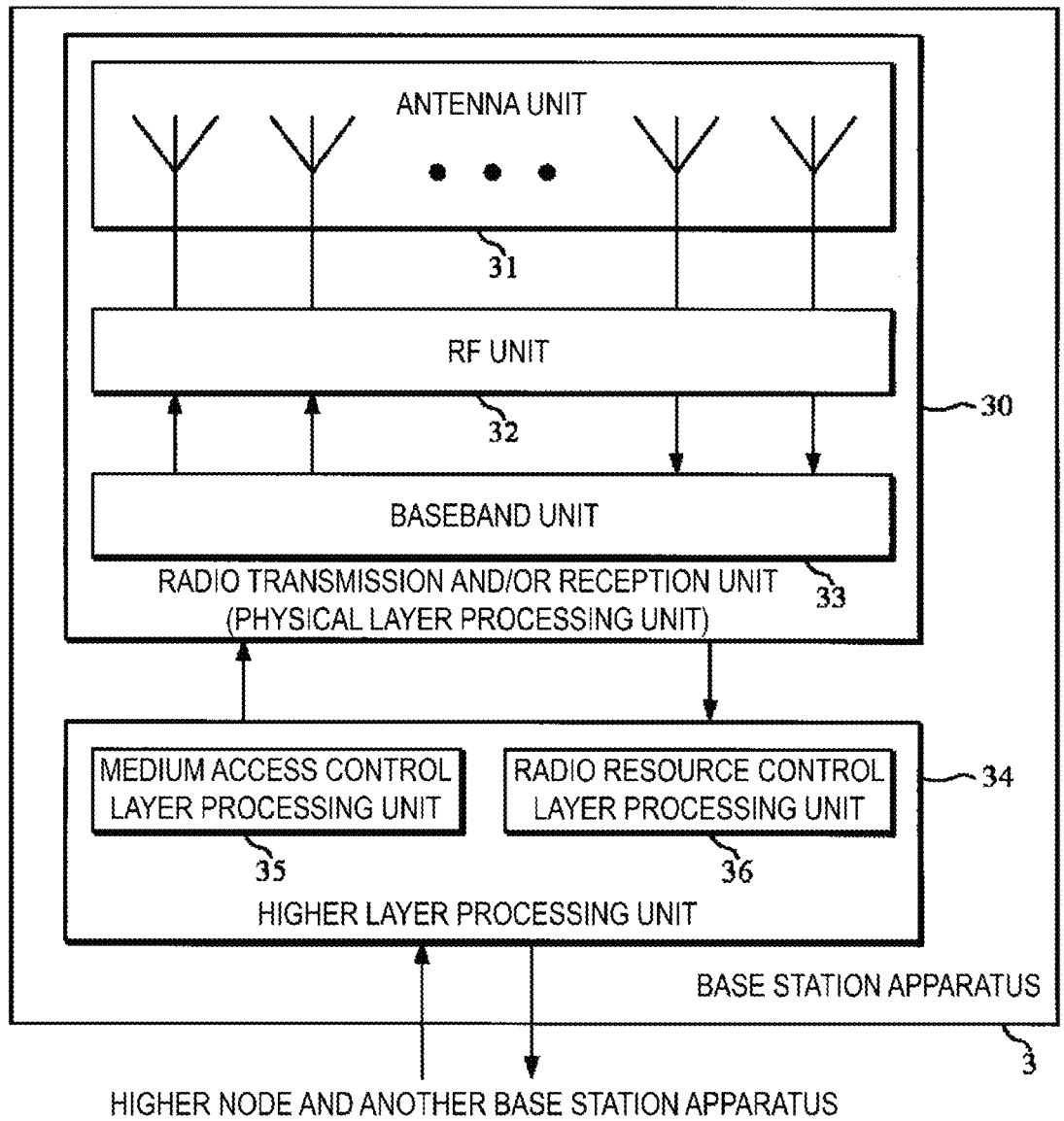
FIG. 5 is a schematic block diagram illustrating a configuration of a target base station apparatus 3B according to the present embodiment.

FIG. 5 is a schematic block diagram illustrating a configuration of the target base station apparatus 3B according to the present embodiment. As illustrated, the target base station apparatus 3B is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. The configuration of the source base station apparatus 3A may be the same as the configuration of the target base station apparatus 3B.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36. The higher layer processing unit 34 may transmit information to another base station apparatus and an MME/GW 3C. The higher layer processing unit 34 may receive information from the other base station apparatus and the MME/GW 3C.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via the higher layer signal. Namely, the radio resource control layer processing unit 36 transmits/broadcasts information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

A random access procedure will be described below in detail. The random access procedure includes a contention based random access procedure and a non-contention based random access procedure. The contention based random access procedure includes a 2 step contention based random access procedure and a 4 step contention based random access procedure. In other words, types/forms of random access procedure may include the 2 step contention based random access procedure, the 4 step contention based random access procedure, and the non-contention based random access procedure.

Figure 6:
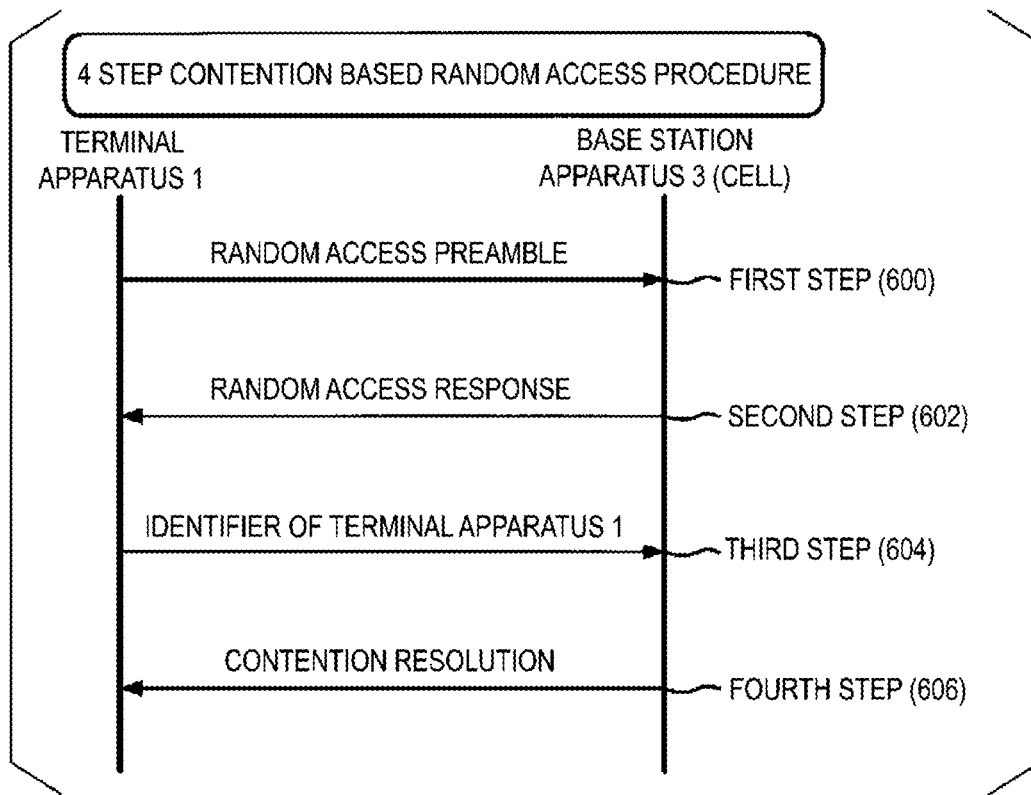
FIG. 6 is a diagram illustrating one example of a 4 step contention based random access procedure according to the present embodiment.

FIG. 6 is a diagram illustrating one example of the 4 step contention based random access procedure according to the present embodiment. The 4 step contention based random access procedure includes a first step (600), a second step (602), a third step (604), and a fourth step (606).

In the first step (600), the terminal apparatus 1 transmits a random access preamble. The random access preamble is included in the PRACH. In the first step (600), the MAC layer itself of the terminal apparatus 1 selects a random access preamble index. That is, in the first step (600), the base station apparatus 3 does not notify the terminal apparatus 1 of the random access preamble index.

In the second step (602), the terminal apparatus 1 receives a random access response. The random access response is included in the PDSCH. Here, the PDCCH for the RA-RNTI is used for scheduling of the PDSCH including the random access response. The value of the RA-RNTI may be given based on a PRACH resource used for transmission of the random access preamble in the first step (600). The random access response includes a random access preamble identifier for indicating the random access preamble index, an uplink grant, information for indicating a Temporary C-RNTI, and information for indicating a timing advance. In a case that the random access response includes a random access preamble identifier corresponding to the random access preamble transmitted in the first step (600), the terminal apparatus 1 considers that the random access response has successfully been received.

In the third step (604), the terminal apparatus 1 transmits an identifier of the terminal apparatus 1. Here, the identifier of the terminal apparatus 1 may be a C-RNTI. The identifier of the terminal apparatus 1 or the C-RNTI is included in the PUSCH. Here, the PUSCH for the identifier of the terminal apparatus 1 or the C-RNTI is scheduled by the uplink grant included in the random access response.

In the fourth step (606), the terminal apparatus 1 receives contention resolution. The contention resolution may be a UE contention resolution identifier or the C-RNTI. In a case that the terminal apparatus 1 has transmitted the C-RNTI in the PUSCH in the third step (604) and the terminal apparatus 1 has received the PDCCH for the C-RNTI, the terminal apparatus 1 may consider that the contention resolution has successfully been performed and that the random access procedure has successfully completed.

Information for indicating the UE contention resolution identifier is included in the PDSCH. Here, the PDCCH for the Temporary C-RNTI is used for scheduling of the PDSCH. In a case that (i) the terminal apparatus 1 does not transmit the C-RNTI in the PUSCH in the third step (604), (ii) the terminal apparatus 1 transmits the identifier of the terminal apparatus 1 in the PUSCH in the third step (604), (iii) the terminal apparatus 1 receives the PDCCH for the Temporary C-RNTI, (iv) the PDSCH scheduled by the PDCCH includes the information for indicating the UE contention resolution identifier, and (v) the UE contention resolution identifier matches the identifier of the terminal apparatus 1 transmitted in the third step (604), the terminal apparatus 1 may consider that the contention resolution has successfully been performed and that the random access procedure has successfully completed.

Figure 7:
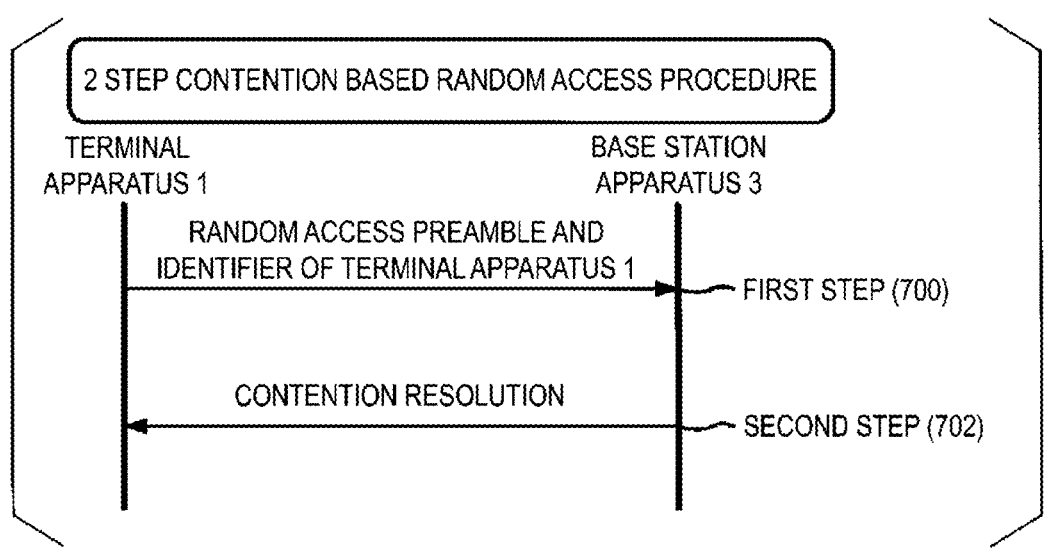
FIG. 7 is a diagram illustrating one example of a 2 step contention based random access procedure according to the present embodiment.

FIG. 7 is a diagram illustrating one example of the 2 step contention based random access procedure according to the present embodiment. The 2 step contention based random access procedure includes a first step (700) and a second step (702).

In the first step (700), a random access preamble and an identifier of the terminal apparatus 1 are transmitted. Here, the identifier of the terminal apparatus 1 may be a C-RNTI. The random access preamble may be included in the PRACH. The identifier of the terminal apparatus 1 may be included in the PUSCH. The random access preamble and the identifier of the terminal apparatus 1 may be included in an identical physical channel. In the first step (700), the MAC layer itself of the terminal apparatus 1 selects a random access preamble index. That is, in the first step (700), the base station apparatus 3 does not notify the terminal apparatus 1 of the random access preamble index.

In the second step (702), the terminal apparatus 1 receives contention resolution. The contention resolution may be a UE contention resolution identifier or the C-RNTI. In a case that the terminal apparatus 1 has transmitted the C-RNTI in the first step (700) and the terminal apparatus 1 has received the PDCCH including the C-RNTI, the terminal apparatus 1 may consider that the contention resolution has successfully been performed and that the random access procedure has successfully completed.

The UE contention resolution identifier is included in the PDSCH. Here, a DCI format to which a CRC scrambled with an X-RNTI is added may be used for scheduling of the PDSCH. The X-RNTI may be given based at least on a resource (PRACH resource) used for the transmission of the random access preamble in the first step (700) and/or a resource (PUSCH resource) used for the transmission of the identifier of the terminal apparatus 1. The X-RNTI may be an RA-RNTI.

In a case that (i) the terminal apparatus 1 does not transmit the C-RNTI in the first step (700), (ii) the terminal apparatus 1 transmits the identifier of the terminal apparatus 1 in the first step (700), (iii) the terminal apparatus 1 receives the PDCCH for the X-RNTI, (iv) the PDSCH scheduled by the PDCCH includes information for indicating the UE contention resolution identifier, and (v) the UE contention resolution identifier matches the identifier of the terminal apparatus 1 transmitted in the first step (700), the terminal apparatus 1 may consider that the contention resolution has successfully been performed and that the random access procedure has successfully completed. The PDSCH scheduled by the PDCCH for the X-RNTI may include some or all of an uplink grant, information for indicating the C-RNTI, and information for indicating a timing advance. In other words, the contention resolution may include some or all of the uplink grant, the information for indicating the C-RNTI, and the information for indicating the timing advance. The PDSCH scheduled by the PDCCH for the X-RNTI may not include information for indicating the random access preamble index. Here, the terminal apparatus 1 may set the C-RNTI to the value of the information for indicating the C-RNTI.

Figure 8:
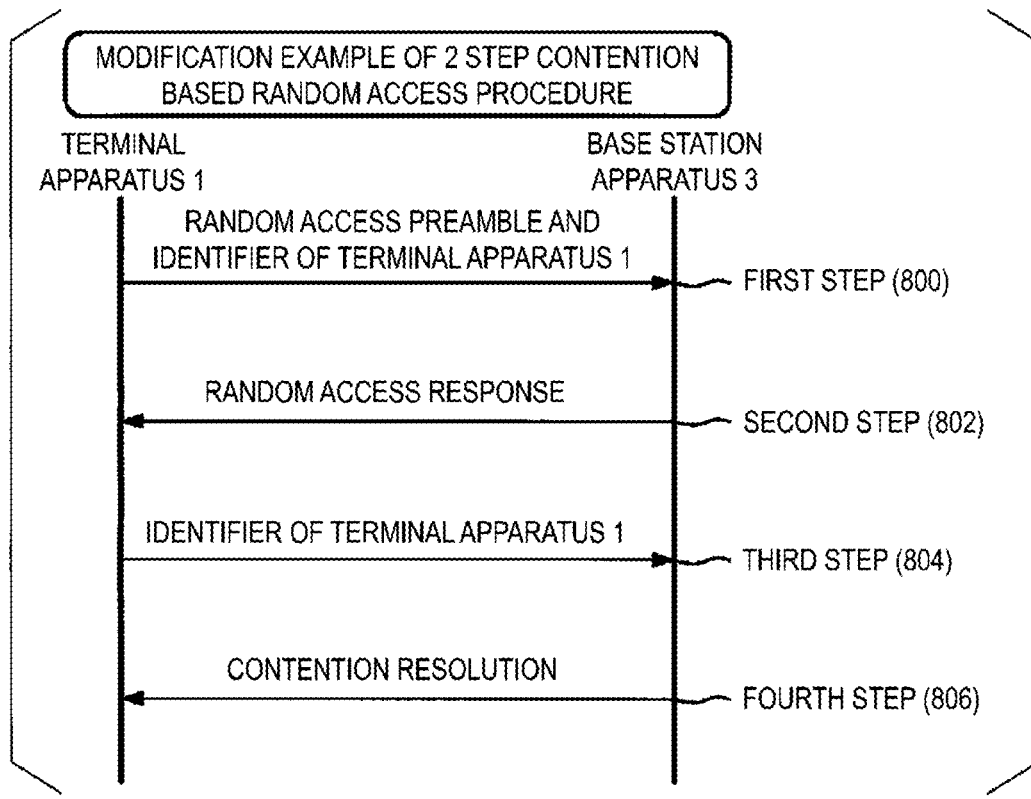
FIG. 8 is a diagram illustrating a modified example of the 2 step contention based random access procedure according to the present embodiment.

FIG. 8 is a diagram illustrating a modification example of the 2 step contention based random access procedure according to the present embodiment. The modification example of the 2 step contention based random access procedure includes a first step (800), a second step (802), a third step (804), and a fourth step (806). The first step (800) is the same as the first step (700). The second step (802) is the same as the second step (602). The third step (804) is the same as the third step (604). The fourth step (806) is the same as the fourth step (606). That is, after the first step of the 2 step contention based random access procedure, a transition may be performed from the 2 step contention based random access procedure to the 4 step contention based random access procedure.

In a case that the base station apparatus 3 detects a random access preamble and cannot detect an identifier of the terminal apparatus 1 in the first step (800), the base station apparatus 3 transmits a random access response in the second step (802). In other words, in a case that the base station apparatus 3 detects the random access preamble and cannot detect the identifier of the terminal apparatus 1 in the first step of the 2 step contention based random access procedure, the base station apparatus 3 may initiate the second step of the 4 step contention based random access procedure. In a case that the base station apparatus 3 detects the random access preamble and the identifier of the terminal apparatus 1 in the first step of the 2 step contention based random access procedure, the base station apparatus 3 may initiate the second step of the 2 step contention based random access procedure.

After the first step (700, 800) of the 2 step contention based random access procedure, the terminal apparatus 1 may monitor the contention resolution of the second step (702) and the random access response of the second step (802). In other words, in the second step (702, 802), the terminal apparatus 1 may monitor the PDCCH associated with the random access response and the PDCCH associated with the contention resolution. The PDCCH associated with the random access response may be the PDCCH for the RA-RNTI. The PDCCH associated with the contention resolution may be the PDCCH for the X-RNTI.

After the first step (600) of the 4 step contention based random access procedure, the terminal apparatus 1 may monitor the random access response of the second step (602). In other words, in the second step (602), the terminal apparatus 1 may monitor the PDCCH associated with the random access response. In the second step (602), the terminal apparatus 1 may not monitor the contention resolution. In other words, in the second step (602), the terminal apparatus 1 may not monitor the PDCCH associated with the contention resolution.

Figure 9:
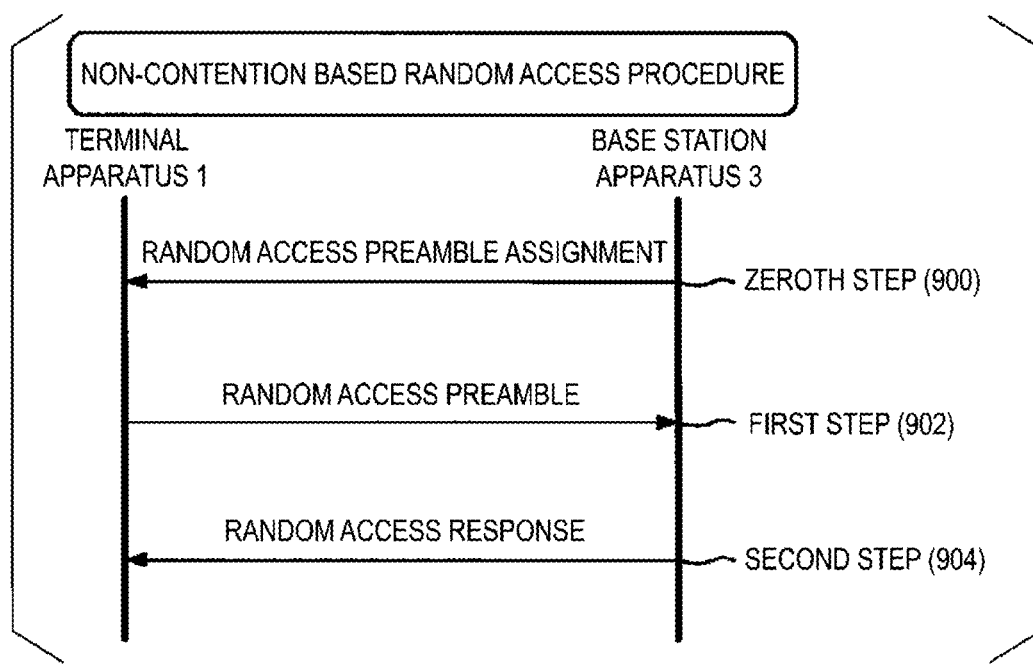
FIG. 9 is a diagram illustrating one example of a non-contention based random access procedure according to the present embodiment.

FIG. 9 is a diagram illustrating one example of the non-contention based random access procedure according to the present embodiment. The non-contention based random access procedure includes a zeroth step (900), a first step (902), and a second step (904).

In the zeroth step (900), the terminal apparatus 1 receives a random access preamble allocation. The random access preamble allocation may be included in a handover command or the PDCCH for the C-RNTI. The random access preamble allocation may indicate a random access preamble index. The PDCCH including the random access preamble allocation is also referred to as a PDCCH order or a PDCCH order for indicating initiation of the random access procedure.

In the first step (902), the terminal apparatus 1 selects a random access preamble based on the random access preamble allocation, and transmits the selected random access preamble. The random access preamble is included in the PRACH. In the first step (902), the MAC layer itself of the terminal apparatus 1 does not select the random access preamble index.

In the second step (904), the terminal apparatus 1 receives the random access response. The random access response is included in the PDSCH. Here, the PDCCH for the RA-RNTI is used for scheduling of the PDSCH including the random access response. The value of the RA-RNTI may be given based on a PRACH resource used for the transmission of the random access preamble in the first step (900). The random access response includes a random access preamble identifier indicating the random access preamble index, an uplink grant, information indicating a Temporary C-RNTI, and information indicating a timing advance. In a case that the random access response includes a random access preamble identifier corresponding to the random access preamble transmitted in the first step (900), the reception of the random access response is considered to be successful. In a case that the random access response includes a random access preamble identifier corresponding to the random access preamble transmitted in the first step (900), the random access preamble allocation is notified, and the MAC itself of the terminal apparatus 1 does not select the random access preamble index, the terminal apparatus 1 considers the random access procedure to have successfully completed.

In the zeroth step (900), in a case that the random access preamble allocation indicates a first prescribed value, the terminal apparatus 1 may initiate the 4 step contention based random access procedure. In other words, the case that the MAC itself of the terminal apparatus 1 does not select the random access preamble index may be a case in which the random access preamble allocation is not the first prescribed value.

In the zeroth step (900), in a case that the random access preamble allocation indicates a second prescribed value, the terminal apparatus 1 may initiate the 2 step contention based random access procedure. In other words, in the case that the MAC itself of the terminal apparatus 1 does not select the random access preamble index may be a case that the random access preamble allocation differs from any of the first prescribed value and the second prescribed value.

FIG. 10 is a diagram illustrating one example of correspondence between events and forms of random access procedures according to the present embodiment. The random access procedures are performed for (event i) initial access from RRC_IDLE, (event ii) RRC connection re-establishment, (event iii) handover, (event iv) downlink data arrival during RRC_CONNECTED, (event v) uplink data arrival during RRC_CONNECTED, and (event vi) time adjustment for a secondary TAG. The random access procedure for (event iv) downlink data arrival during RRC_CONNECTED may be performed in a case that an uplink synchronization status is asynchronous. The random access procedure for (event v) uplink data arrival during RRC_CONNECTED may be performed in a case that the uplink synchronization status is asynchronous or in a case that there is no PUCCH resource for a scheduling request.

The random access procedures related to event i to event v may be performed in a primary cell. A first step in the random access procedure related to event vi may be performed in a secondary cell. In other words, the random access procedure performed for (event vi) time adjustment for a secondary TAG is initiated in the secondary cell belonging to the secondary TAG.

The random access procedure for (event i) initial access from RRC_IDLE may include the 4 step contention based random access procedure and the 2 step contention based random access procedure. The random access procedure for (event i) initial access from RRC_IDLE may not include the non-contention based random access procedure. The random access procedure for (event i) initial access from RRC_IDLE may be initiated by the RRC.

The random access procedure for (event ii) RRC connection re-establishment may include the 4 step contention based random access procedure and the 2 step contention based random access procedure. The random access procedure for (event ii) RRC connection re-establishment may not include the non-contention based random access procedure. The random access procedure for (event ii) RRC connection re-establishment may be initiated by the RRC.

The random access procedures including the 4 step contention based random access procedure may mean that the 4 step contention based random access procedure is supported, the 4 step contention based random access procedure is enabled, or the 4 step contention based random access procedure is applicable. The same applies to the 2 step random access procedure and the non-contention based random access procedure.

System information transmitted/broadcast by the base station apparatus 3 (cell) may include PRACH information and random access information. The PRACH information may include information for indicating a PRACH resource, information of the physical root sequence index u related to a random access preamble, and information of the cyclic shift $C_v$ for the random access preamble. The physical root sequence index u and the cyclic shift $C_v$ are used to determine a random access preamble sequence. The random access information may include information for indicating the number of random access preambles and information for indicating the number of random access preambles for the contention based random access procedure. In addition, the system information may include information for the 2 step contention based random access procedure. The information for the 2 step contention based random access procedure may include information for indicating that the 2 step contention based random access procedure is supported in the cell, information for indicating a resource for transmitting an identifier of the terminal apparatus 1 in the first step of the 2 step contention based random access procedure, information for indicating a modulation scheme for data including the identifier of the terminal apparatus 1 in the first step of the 2 step contention based random access procedure, and/or information for indicating a Reference Signal Received Power (RSRP) threshold. Here, the system information does not include a random access preamble allocation for a zeroth step of the non-contention based random access procedure.

The terminal apparatus 1 measures RSRP from a downlink reference signal of the cell. The terminal apparatus 1 may initiate either the 2 step contention based random access procedure or the 4 step contention based random access procedure based on the measured RSRP and the threshold of the RSRP. In a case that the measured RSRP does not exceed the threshold of the RSRP, the terminal apparatus 1 may initiate the 4 step contention based random access procedure. In a case that the measured RSRP exceeds the threshold of the RSRP, the terminal apparatus 1 may initiate the 2 step contention based random access procedure.

The random access procedure for (event iii) handover may include the 4 step contention based random access procedure, the 2 step contention based random access procedure, and the non-contention based random access procedure. A handover command may include the above-described PRACH information, the above-described random access information, the above-described information for the 2 step contention based random access procedure, and/or the random access preamble allocation for the zeroth step of the non-contention based random access procedure.

The terminal apparatus 1 may initiate one of the 4 step contention based random access procedure, the 2 step contention based random access procedure, and the non-contention based random access procedure based on the information included in the handover command.

In a case that the handover command includes the random access preamble allocation, the terminal apparatus 1 may initiate the non-contention based random access procedure.

In a case that the handover command does not include the random access preamble allocation and the handover command includes the information for the 2 step contention based random access procedure, the terminal apparatus 1 may initiate either the 2 step contention based random access procedure or the 4 step contention based random access procedure based on the measured RSRP and the threshold of the RSRP.

In a case that the handover command does not include the random access preamble allocation and the handover command includes the information for the 2 step contention based random access procedure, the terminal apparatus 1 may initiate either the 2 step contention based random access procedure or the 4 step contention based random access procedure based on the measured RSRP and the threshold of the RSRP. Here, in a case that the measured RSRP does not exceed the threshold of the RSRP, the terminal apparatus 1 may initiate the 4 step contention based random access procedure. Here, in a case that the measured RSRP exceeds the threshold of the RSRP, the terminal apparatus 1 may initiate the 2 step contention based random access procedure.

In a case that the handover command includes the random access preamble allocation and the random access preamble allocation indicates a first prescribed value, the terminal apparatus 1 may initiate the 4 step contention based random access procedure.

In a case that the handover command includes the random access preamble allocation, the random access preamble allocation indicates a second prescribed value, and the handover command includes the information for the 2 step contention based random access procedure, the terminal apparatus 1 may initiate the 2 step contention based random access procedure.

In a case that the handover command does not include the random access preamble allocation and the handover command does not include the information for the 2 step contention based random access procedure, the terminal apparatus 1 may initiate the 4 step contention based random access procedure.

The random access procedure for (event iv) downlink data arrival during RRC_CONNECTED may include the 4 step contention based random access procedure and the non-contention based random access procedure. The random access procedure for (event iv) downlink data arrival during RRC_CONNECTED may not include the 2 step contention based random access procedure. The random access procedure for (event iv) downlink data arrival during RRC_CONNECTED is initiated by a PDCCH order.

In a case that the random access preamble allocation included in the PDCCH order is a value other than the first prescribed value, the terminal apparatus 1 may initiate the non-contention based random access procedure. In a case that the random access preamble allocation included in the PDCCH order is the first prescribed value, the terminal apparatus 1 may initiate the 4 step contention based random access procedure. Even in a case that the random access preamble allocation included in the PDCCH order is the second prescribed value, the terminal apparatus 1 may initiate the 4 step contention based random access procedure.

The random access procedure for (event v) uplink data arrival during RRC_CONNECTED may include the 4 step contention based random access procedure and the 2 step contention based random access procedure. The random access procedure for (event v) uplink data arrival during RRC_CONNECTED may not include the non-contention based random access procedure. The random access procedure for (event v) uplink data arrival during RRC_CONNECTED is initiated by the MAC itself.

The random access procedure performed for (event vi) time adjustment for a secondary TAG is initiated by a PDCCH order. In other words, the random access preamble allocation included in the PDCCH order for indicating initiation of the random access procedure in a secondary cell indicates a value other than the first prescribed value.

FIG. 11 is a diagram illustrating another example of correspondence between events and forms of random access procedures according to the present embodiment. The random access procedures are initiated by (event A) RRC, (event B) MAC itself, or (event C) PDCCH order.

The random access procedure initiated by (event A) RRC may include the 4 step contention based random access procedure, the 2 step contention based random access procedure, and the non-contention based random access procedure.

The random access procedure initiated by (event B) MAC itself may include the 4 step contention based random access procedure and the 2 step contention based random access procedure. The random access procedure initiated by (event B) MAC itself may not include the non-contention based random access procedure.

The random access procedure initiated by a PDCCH order may include the 4 step contention based random access procedure and the non-contention based random access procedure. The random access procedure initiated by the PDCCH order may not include the 2 step contention based random access procedure.

The random access procedure initiated in a primary cell based on (event C) PDCCH order may include the 4 step contention based random access procedure and the non-contention based random access procedure. The random access procedure initiated in the primary cell based on (event C) PDCCH order may not include the 2 step contention based random access procedure.

The random access procedure initiated in a secondary cell based on (event D) PDCCH order may include the non-contention based random access procedure. The random access procedure initiated in the secondary cell based on (event D) PDCCH order may not include the 4 step contention based random access procedure and the 2 step contention based random access procedure.

In the first step of the 2 step contention based random access procedure, a resource for the transmission of the random access preamble and a resource for the identifier of the terminal apparatus 1 may be time-multiplexed. The resource for the transmission of the random access preamble and the resource for the identifier of the terminal apparatus 1 may be frequency-multiplexed. Data including the identifier of the terminal apparatus 1 in the first step of the 2 step contention based random access procedure is also referred to as a message X. The message X may be transmitted through information bits and may be channel-coded. The resource for the transmission of the random access preamble may be a PRACH resource. A resource for transmission of the message X may be a PUSCH resource.

Figure 12:
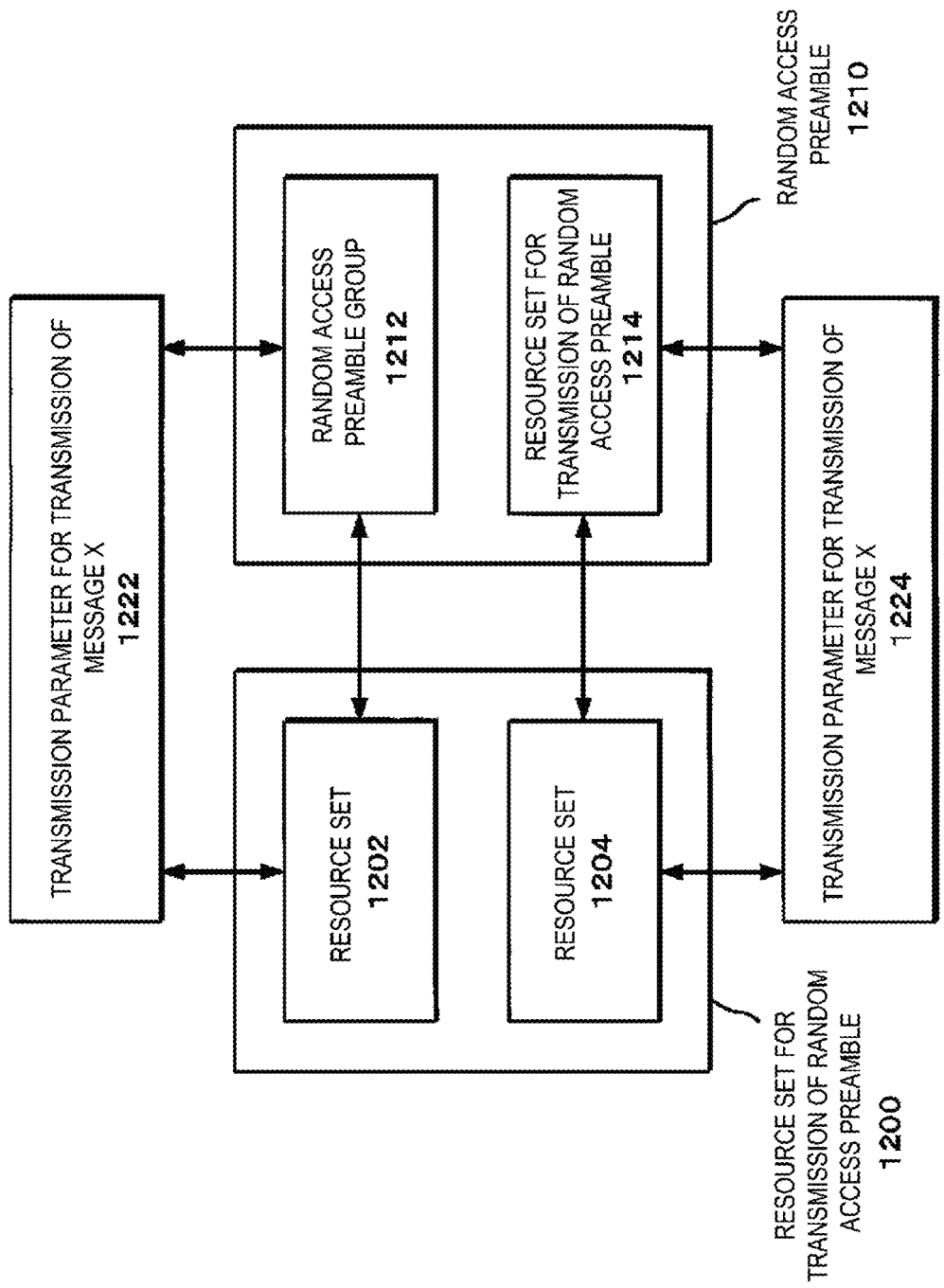
FIG. 12 is a diagram illustrating one example of correspondence among resource sets for transmission of a random access preamble, transmission parameters for transmission of a message X, and random access preamble groups in the 2 step contention based random access procedure according to the present embodiment.

FIG. 12 is a diagram illustrating one example of correspondence among resource sets for transmission of a random access preamble, transmission parameters for transmission of the message X, and random access preamble groups in the 2 step contention based random access procedure according to the present embodiment. In the first step of the 2 step contention based random access procedure, a resource set for the transmission of the random access preamble, a transmission parameter for the transmission of the message X, and a random access preamble group may correspond to each other. In FIG. 12, a resource set 1202, a random access preamble group 1212, and a transmission parameter 1222 for the transmission of the message X correspond to each other. In FIG. 12, a resource set 1204, a random access preamble group 1214, and a transmission parameter 1224 for the transmission of the message X correspond to each other. In a case that the terminal apparatus 1 selects the resource set 1202, the terminal apparatus 1 selects a resource from the resource set 1202, and selects a random access preamble from the random access preamble group 1212, transmits the selected random access preamble by using the selected resource, and transmits the message X based on the transmission parameter 1222. The transmission parameter 1222 may include multiple transmission parameter sets. The terminal apparatus 1 may select one transmission parameter set from the transmission parameter 1222. The transmission parameter is also referred to as scheduling information.

A base station apparatus may transmit information for indicating the resource set 1202, information for indicating the resource set 1204, information for indicating the random access preamble group 1212, information for indicating the random access preamble group 1214, information for indicating the transmission parameter 1222 for the transmission of the message X, and information for indicating the transmission parameter 1224 for the transmission of the message X. The information may be included in the PDCCH or the PDSCH. The information may be included in downlink control information, RRC signaling, MAC CE, and/or higher layer signaling. The resource set 1202 and the resource set 1204 may correspond to different cells.

The terminal apparatus 1 may select, among multiple resource sets for the transmission of the random access preamble, a set to be used to initiate the random access procedure. For example, the terminal apparatus 1 may select one set among multiple resource sets for the transmission of the random access preamble based on measurement using a downlink physical signal (a synchronization signal and/or a downlink reference signal). The measurement using the downlink physical signal may be measurement of a downlink path loss and/or downlink physical signal reception power. The downlink path loss may be calculated based on a downlink physical signal transmit power and the downlink physical signal reception power.

Figure 13:
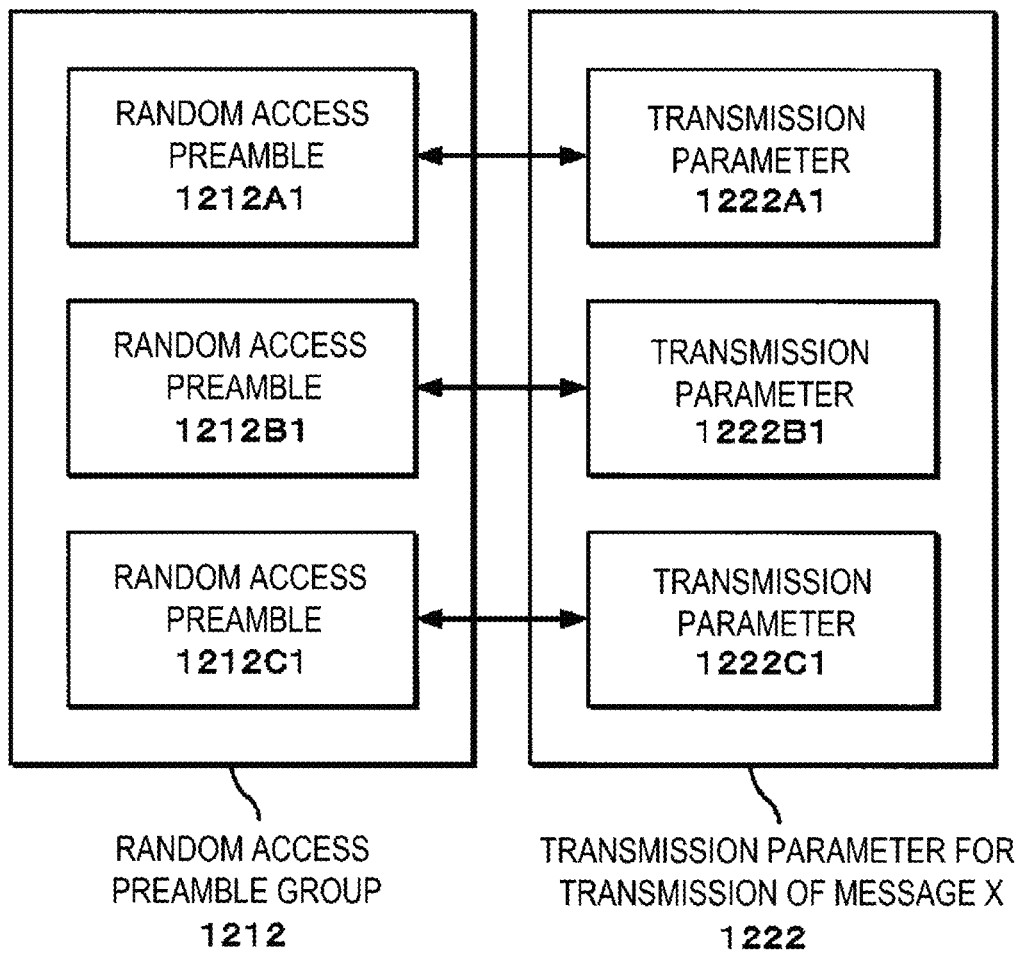
FIG. 13 is a diagram illustrating one example of correspondence between random access preambles and transmission parameters for transmission of the message X in the 2 step contention based random access procedure according to the present embodiment.

FIG. 13 is a diagram illustrating one example of correspondence between random access preambles and transmission parameters for transmission of the message X in the 2 step contention based random access procedure according to the present embodiment. The random access preamble group 1212 may include random access preambles 1212A1, 1212B1, and 1212C1. The transmission parameter for the transmission of the message X may include transmission parameters 1222A1, 1222B1, and 1222C1. The random access preamble 1212A1 corresponds to the transmission parameter 1222A1. The random access preamble 1212B1 corresponds to the transmission parameter 1222B1. The random access preamble 1212C1 corresponds to the transmission parameter 1222C1. The terminal apparatus 1 may select a set of a random access preamble and a transmission parameter. The terminal apparatus 1 may select a random access preamble from a random access preamble group, and select a transmission parameter corresponding to the selected random access preamble. The terminal apparatus 1 may select a transmission parameter and select a random access preamble corresponding to the selected transmission parameter. The terminal apparatus 1 may randomly select a random access preamble from the random access preamble group 1212. The terminal apparatus 1 may transmit the selected random access preamble by using a selected resource, and transmit the message X based on the selected transmission parameter.

Figure 14:
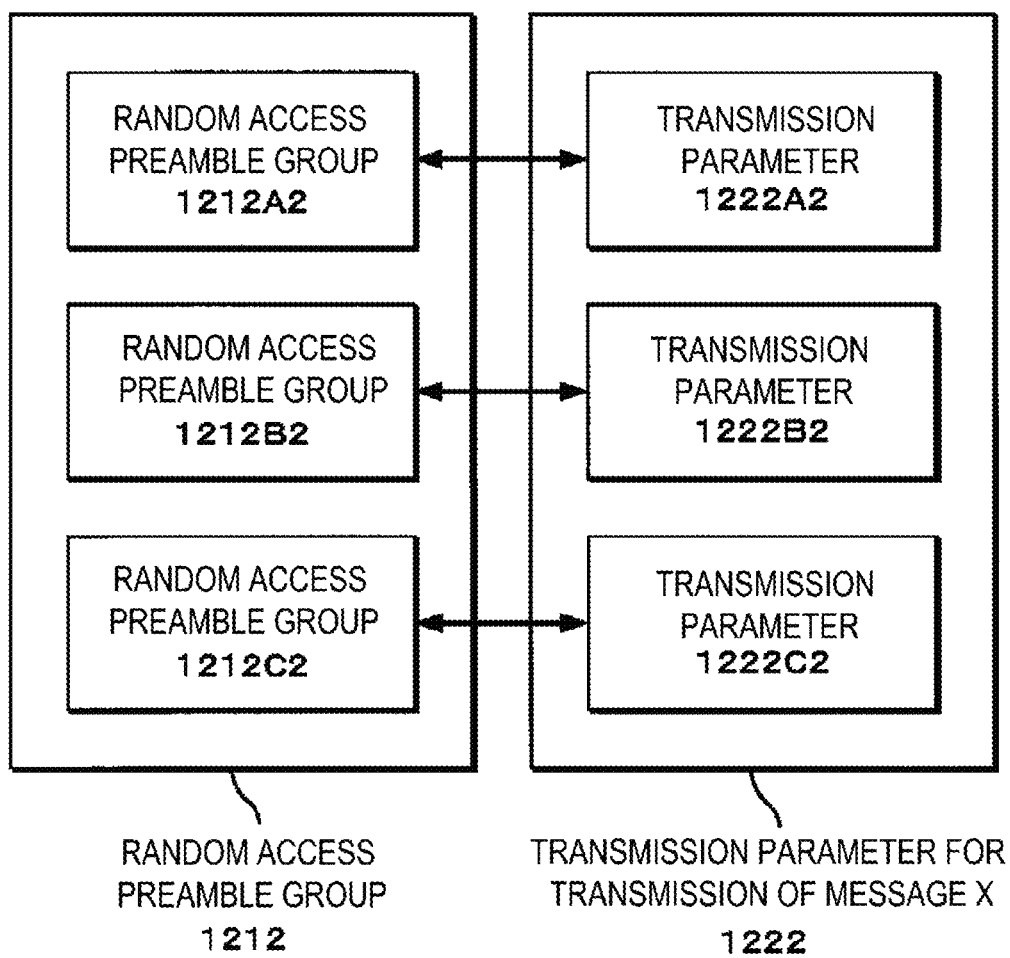
FIG. 14 is a diagram illustrating one example of correspondence between random access preamble groups and transmission parameters for transmission of the message X in the 2 step contention based random access procedure according to the present embodiment.

FIG. 14 is a diagram illustrating one example of correspondence between random access preamble groups and transmission parameters for transmission of the message X in the 2 step contention based random access procedure according to the present embodiment. The random access preamble group 1212 may include random access preamble groups 1212A2, 1212B2, and 1212C2. The transmission parameter 1222 for the transmission of the message X may include transmission parameters 1222A2, 1222B2, and 1222C2. The random access preamble group 1212A2 corresponds to the transmission parameter 1222A2. The random access preamble group 1212B2 corresponds to the transmission parameter 1222B2. The random access preamble group 1212C2 corresponds to the transmission parameter 1222C2.

The terminal apparatus 1 may select a set of a random access preamble group and a transmission parameter. The terminal apparatus 1 may select a random access preamble and select a transmission parameter corresponding to a group to which the selected random access preamble belongs. The terminal apparatus 1 may randomly select a random access preamble from the random access preamble group 1212. The terminal apparatus 1 may transmit the selected random access preamble by using a selected resource, and transmit the message X based on the selected transmission parameter.

The terminal apparatus 1 may select one group among the multiple random access preamble groups {1212A2, 1212B2, 1212C2}, select a random access preamble from the selected group, and select a transmission parameter corresponding to the selected random access preamble. Here, the terminal apparatus 1 may randomly select a random access preamble from the selected group. For example, the terminal apparatus 1 may select one group among the multiple random access preamble groups {1212A2, 1212B2, 1212C2} based on measurement using a downlink physical signal (a synchronization signal and/or a downlink reference signal), the size of the message X, a value A1 given in accordance with information received from the base station apparatus 3, and/or a value A2 given in accordance with the information received from the base station apparatus 3. The terminal apparatus 1 may select one group among the multiple random access preamble groups {1212A2, 1212B2, 1212C2} based on whether or not the size of the message X is greater than the value A1 and/or whether or not the result of the measurement using the downlink physical signal is greater than the value A2. For example, in a case that the size of the message X is greater than the value A1 and the result of the measurement using the downlink physical signal is smaller than the value A2, the terminal apparatus 1 may select the random access preamble group 1212A2. For example, in a case that the size of the message X is equal to or smaller than the value A1, or in a case that the result of the measurement using the downlink physical signal is equal to or greater than the value A2, the terminal apparatus 1 may select the random access preamble group 1212B2.

Here, the value A2 may be given based on a value indicated by the information received from the base station apparatus 3 and/or a maximum transmit power value for a serving cell in which the terminal apparatus 1 performs the random access procedure. The value A1 and the value A2 may be configured separately for the random access preamble group 1212 and the random access preamble group 1214. The terminal apparatus 1 may separately configure a parameter for calculating the values A1 and A2 for the random access preamble group 1212 and a parameter for calculating the values A1 and A2 for the random access preamble group 1214. The base station apparatus 3 may transmit information for indicating the multiple parameters.

The transmission parameter for transmission of the message X includes a parameter D1 related to a modulation scheme, a parameter D2 related to a resource, a parameter D3 related to the size (the number of bits) of the message X, a parameter D4 related to initialization of a scrambling sequence used for scrambling of coded bits or modulation symbols of the message X, a parameter D5 related to code spreading of the message X, a parameter D6 related to a DMRS associated with transmission of a PUSCH including the message X, and/or a parameter D7 related to a transmit power. The transmission parameter may include parameters other than the parameters D1 to D7.

The modulation scheme may include Quadrature Phase Shift Keying (QPSK) and Quadrature Amplitude Modulation (QAM). The parameter D2 related to a resource may be associated with a subframe, a transmission bandwidth, and/or a transmission frequency. The transmission bandwidth and the transmission frequency may be represented by a physical resource block or a subcarrier. The size of the message X may be the number of information bits of the message X before coding. The scrambling sequence may be a pseudo-random sequence. The scrambling sequence may be given by a Gold sequence and/or one or more M sequences.

The terminal apparatus 1 generates a DMRS based on the parameter D6 related to a DMRS. The DMRS is given based on a DMRS sequence $r_{PUSCH}$. The DMRS sequence $r_{PUSCH}$ is defined by Equation 3, where $r^{(\alpha)}$ is an RS sequence given by Equation 4, w is an orthogonal cover code, $e^x$ is an exponential function the base of which is the Napier's number e, j is an imaginary number, $\alpha$ is a cyclic shift, r' is a base sequence, and $M_{RS\_SC}$ is the length of the base sequence r'. $M_{RS\_SC}$ may be the number of resource elements (subcarriers) corresponding to the DMRS in one SC-FDMA symbol. The base sequence may be given based on a Zadoff-Chu sequence, a Gold sequence, and/or an M sequence.

$$r_{PUSCH}(m \cdot M_{RS\_sc}+n)=w(m)r^{(\alpha)}(n), m=0,1 \ 0 \leq n < M_{RS\_sc} \quad \text{Equation 3}$$

$$r^{(\alpha)}(n)=e^{j\alpha n}r'(n), 0 \leq n < M_{RS\_sc} \quad \text{Equation 4}$$

The parameter D6 related to a DMRS may include a parameter used to determine the orthogonal cover code w, a parameter used to determine the cyclic shift $\alpha$, a parameter used to determine the base sequence r', a parameter used to determine the length $M_{RS\_SC}$ of the base sequence r', and/or a parameter used to determine the resources (resource elements) corresponding to the DMRS.

Figure 15:
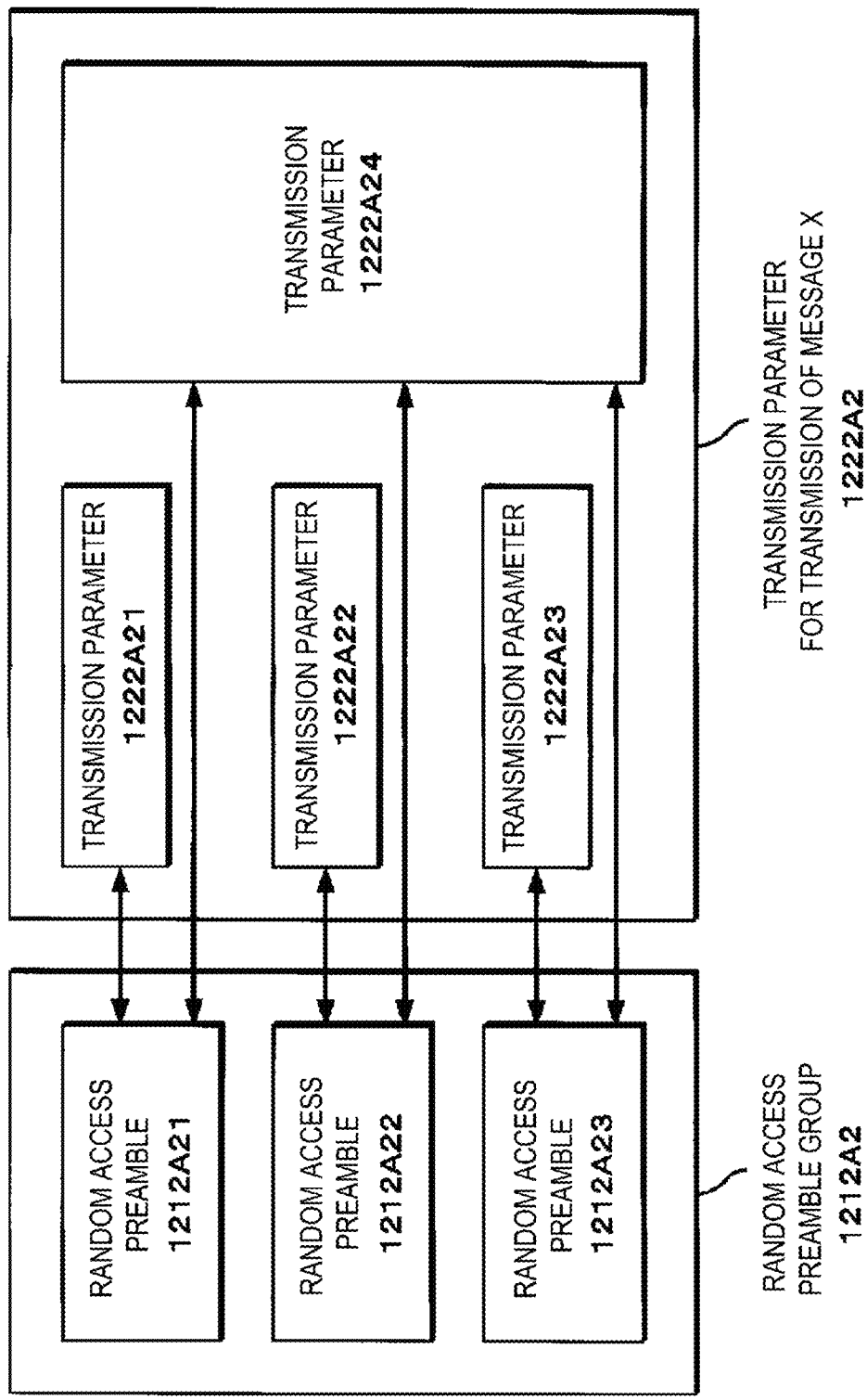
FIG. 15 is a diagram illustrating another example of correspondence between random access preambles and transmission parameters for transmission of the message X in the 2 step contention based random access procedure according to the present embodiment.

FIG. 15 is a diagram illustrating another example of correspondence between random access preambles and transmission parameters for the transmission of the message X in the 2 step contention based random access procedure according to the present embodiment. The random access preamble group 1212A may include random access preambles 1212A21, 1212A22, and 1212A23. The transmission parameter 1222A2 for the transmission of the message X may include transmission parameters 1222A21, 1222A22, 1222A23, and 1222A24. The random access preamble 1212A21 corresponds to the transmission parameters 1222A21 and 1222A24. The random access preamble 1212A22 corresponds to the transmission parameters 1222A22 and 1222A24. The random access preamble 1212A23 corresponds to the transmission parameters 1222A23 and 1222A24. 1222A24 may correspond to all the random access preambles belonging to the group 1212A2.

The terminal apparatus 1 may select a random access preamble and select a transmission parameter corresponding to the selected random access preamble. The terminal apparatus 1 may randomly select a random access preamble from the random access preamble group 1212A2. The terminal apparatus 1 may select the random access preamble 1212A21, and select the transmission parameter 1222A21 and the transmission parameter 1222A24 corresponding to the selected random access preamble 1212A21. The terminal apparatus 1 may transmit the selected random access preamble and transmit the message X based on the selected transmission parameter.

The transmission parameters 1222A21, 1222A22, and 1222A23 may include some of the parameters D1 to D6 described above, and the transmission parameter 1222A24 may include the remainder of the parameters D1 to D6 described above. For example, the transmission parameter 1222A21 may include the parameter D4 related to initialization of a scrambling sequence used for scrambling of coded bits or modulation symbols of the message X, the parameter D5 related to code spreading of the message X, the parameter D6 related to a DMRS associated with transmission of a PUSCH including the message X, and/or the parameter D7 related to a transmit power. For example, the transmission parameter 1222A24 may include the parameter D1 related to a modulation scheme, the parameter D2 related to a resource, and/or the parameter D3 related to the size (number of bits) of the message X. The transmission parameters 1222A21, 1222A22, 1222A23, and 1222A24 may include parameters other than the parameters D1 to D7 described above.

The embodiments illustrated in FIG. 13 and FIG. 14 may be applied to the random access preamble group 1214 and the transmission parameter 1224. The embodiment illustrated in FIG. 15 may be applied to the random access preamble groups 1212B2 and 1212C2 and the transmission parameters 1222B2 and 1222C2.

In the first step of the 2 step contention based random access procedure, information related to a random access preamble may be transmitted together with the message X. The message X may include the information related to the random access preamble. The information related to the random access preamble may include information for indicating a random access preamble index (information A), information for indicating a resource for transmission of the random access preamble (information B), and/or information related to a random access preamble sequence (information C). In the first step of the 2 step contention based random access procedure, the terminal apparatus 1 may transmit a random access preamble having an index 1 by using a PRACH resource, and transmit the message X including the information A for indicating the index 1 of the random access preamble by using a PUSCH. The information related to a random access preamble sequence (information C) may indicate a physical root sequence index and/or a cyclic shift.

Figure 16:
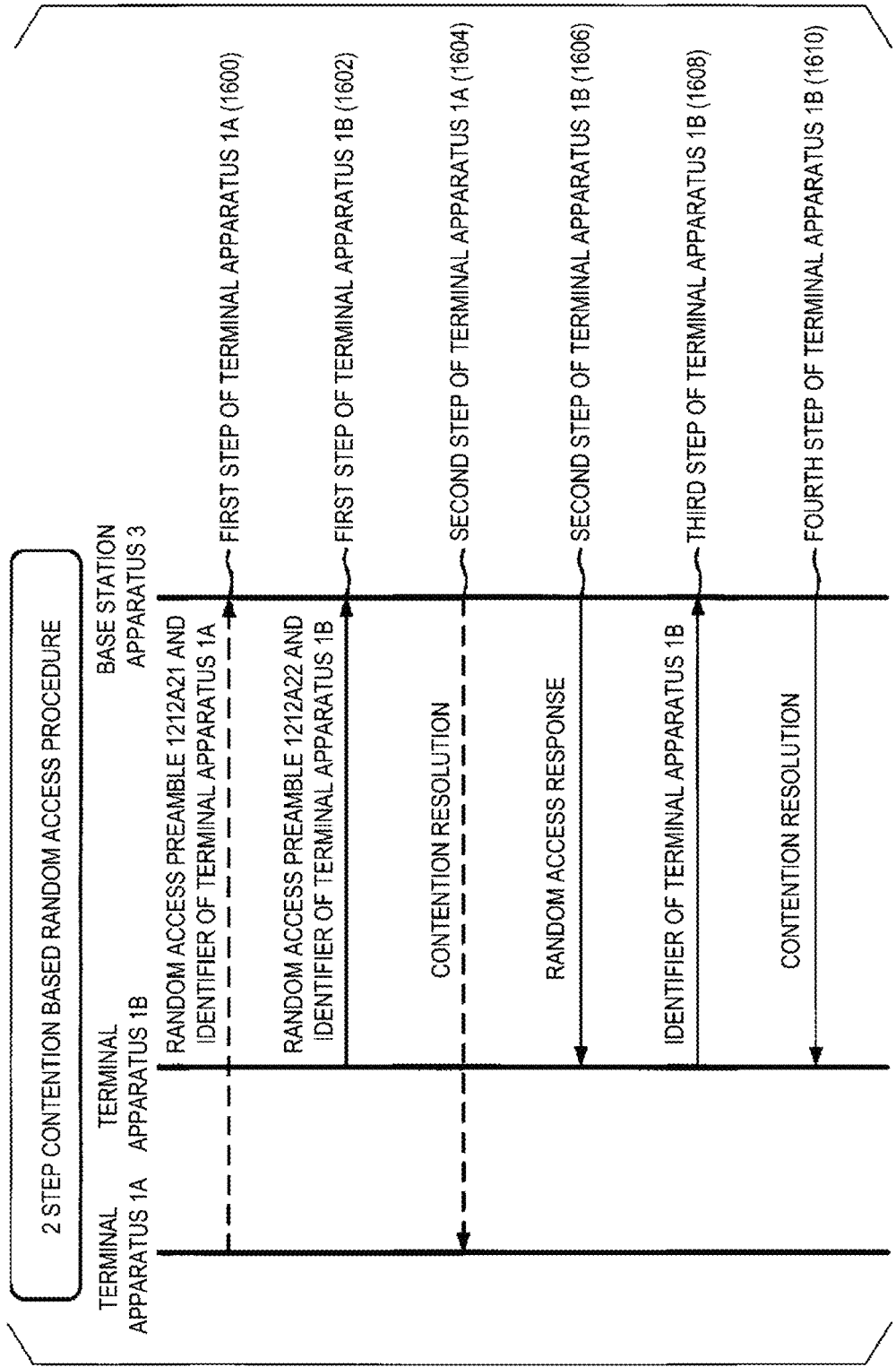
FIG. 16 is a diagram illustrating one example of the 2 step contention based random access procedure according to the present embodiment.

FIG. 16 is a diagram illustrating one example of the 2 step contention based random access procedure according to the present embodiment. In 1600 and 1602 in FIG. 16, the terminal apparatus 1A and the terminal apparatus 1B initiate the 2 step contention based random access procedure. The random access preamble 1212A21 selected by the terminal apparatus 1A differs from the random access preamble 1212A22 selected by the terminal apparatus 1B. However, a transmission parameter to which the random access preamble 1212A21 selected by the terminal apparatus 1A corresponds may be the same as a transmission parameter to which the random access preamble 1212A24 selected by the terminal apparatus 1B corresponds. The transmission parameter may be 1222A24.

In 1600, the terminal apparatus 1A transmits the random access preamble 1212A21. In 1600, the terminal apparatus 1A transmits, based on the transmission parameter 1222A24, the message X including an identifier of the terminal apparatus 1A and an index of the random access preamble 1222A21. In 1602, the terminal apparatus 1B transmits the random access preamble 1212A22. In 1602, the terminal apparatus 1B transmits, based on the transmission parameter 1222A24, the message X including an identifier of the terminal apparatus 1B and an index of the random access preamble 1222A21.

In a case that the base station apparatus 3 successfully detects the random access preamble 1212A21 and the random access preamble 1212A22, successfully receives/detects the message X transmitted by the terminal apparatus 1A, and fails to receive/detect the message transmitted by the terminal apparatus 1B, the base station apparatus 3 transmits a contention resolution based on the identifier of the terminal apparatus 1A (1604), and transmits a random access response corresponding to the random access preamble 1212A22 (1606). In a case that the terminal apparatus 1B receives the random access response, the terminal apparatus 1B transmits the identifier of the terminal apparatus 1B by using a PUSCH, based on an uplink grant included in the random access response (1608). Next, the terminal apparatus 1B receives the contention resolution (1610). In a case that the message X transmitted by the terminal apparatus 1A includes information for indicating the index of the random access preamble 1212A21, the base station apparatus 3 may not transmit a random access response corresponding to the random access preamble 1212A21. Note that information for indicating a random access preamble may be represented by a scrambling sequence used for scrambling of coding bits or modulation symbols of the message X, code spreading of the message X, and/or a DMRS associated with transmission of a PUSCH including the message X.

Figure 17:
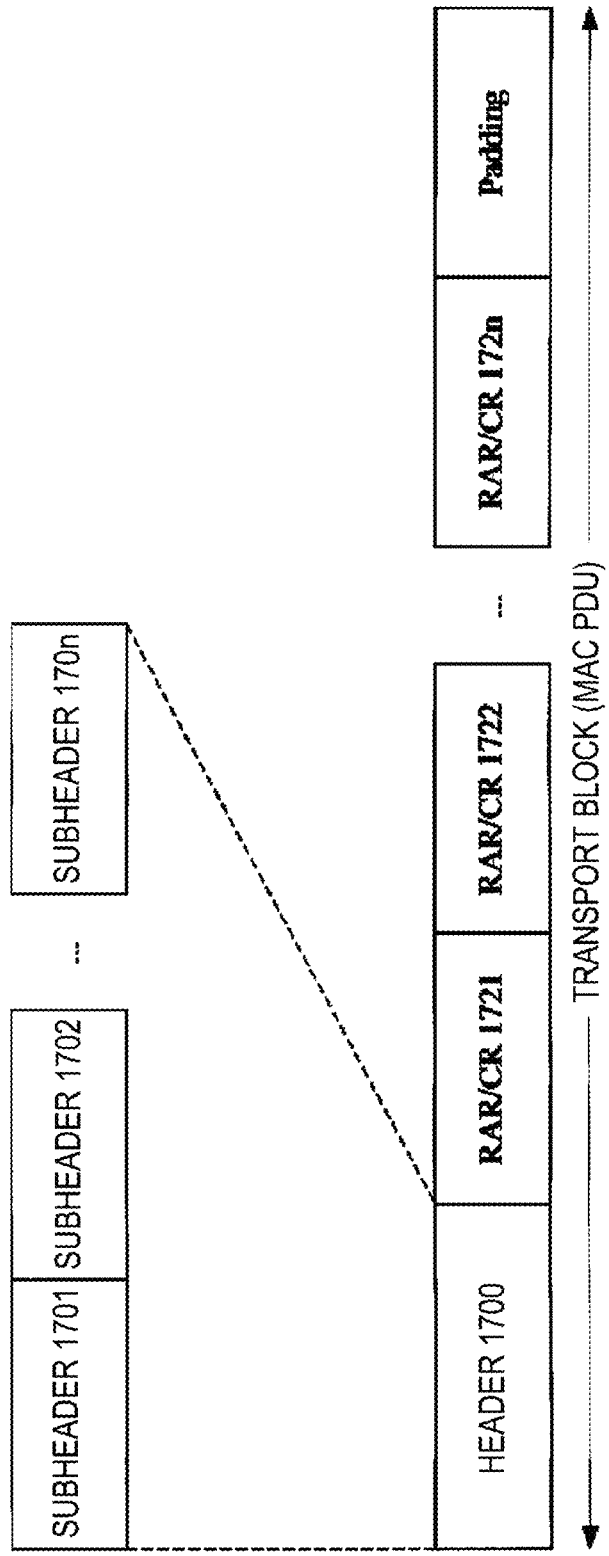
FIG. 17 is a diagram illustrating one example of a transport block including a random access response and/or a contention resolution according to the present embodiment.

In 1604 and 1606 in FIG. 16, the random access response and the contention resolution may be included in the same PDSCH. In other words, in 1604 and 1606 in FIG. 16, a transport block including the random access response and the contention resolution may be transmitted by using the PDSCH. A DCI format to which a CRC scrambled with the above-described RA-RNTI or the above-described X-RNTI is added may be used for scheduling of the PDSCH. FIG. 17 is a diagram illustrating one example of a transport block including a random access response and/or a contention resolution according to the present embodiment. In FIG. 17, the transport block includes a header 1700 and n RAR/CR {1721, 1722, . . . , 172n}. The RAR/CR is a random access response or a contention resolution. The header 1700 includes n subheaders {1701, 1702, . . . , 170n}. Each of the headers may correspond to each of the RAR/CR. For example, the subheader 1701 may correspond to the RAR/CR 1721.

Each of the subheaders {1701, 1702, . . . 170n} may include a random access preamble identifier for indicating a random access preamble index. In a case that the subheader 1701 includes a random access preamble identifier for indicating the random access preamble index transmitted in the first step of the 2 step contention based random access procedure, the terminal apparatus 1 may check the RAR/CR 1721 corresponding to the subheader 1701.

A subheader may include a flag for indicating that a random access response is included in a RAR/CR to which the subheader corresponds. A subheader may include a flag for indicating that a contention resolution is included in a RAR/CR to which the subheader corresponds. A subheader may include a flag for indicating that which of a random access response and a contention resolution is included in a RAR/CR to which the subheader corresponds. Based on the flag, the terminal apparatus 1 may identify which of a random access response and a contention resolution is included in the RAR/CR.

In a case that the flag included in the subheader indicates that the RAR/CR includes a contention resolution, the subheader may not include the random access preamble identifier, and the subheader may include information for indicating an index of a resource for transmission of the message X. In a case that the subheader 1701 includes information for indicating an index of a resource for the transmission of the message X in the first step of the 2 step contention based random access procedure, the terminal apparatus 1 may check the RAR/CR 1721 corresponding to the subheader 1701. The index of the resource for the transmission of the message X may be assigned to a frequency-time resource. Different indexes may be assigned to different resources corresponding to different transmission parameters.

An RAR/CR may include a flag for indicating that a random access response is included in the RAR/CR. An RAR/CR may include a flag for indicating that a contention resolution is included in the RAR/CR. An RAR/CR may include a flag for indicating which of a random access response and a contention resolution is included in the RAR/CR. Based on the flag, the terminal apparatus 1 may identify which of a random access response and a contention resolution is included in the RAR/CR.

In a case that a random access preamble identifier included in a subheader is set to a prescribed value, the terminal apparatus 1 may determine that an RAR/CR to which the subheader corresponds includes a contention resolution. The prescribed value may be 0. The prescribed value may be 1. Based on a value set in a header field included in a transport block, the terminal apparatus 1 may determine that the transport block includes a contention resolution and/or a random access response.

In a given cell, a random access preamble group corresponding to the 2 step contention based random access procedure may be the same as a random access preamble group corresponding to the 4 step contention based random access procedure. In a given cell, a resource set for transmission of a random access preamble corresponding to the 2 step contention based random access procedure may be the same as a resource set for transmission of a random access preamble corresponding to the 4 step contention based random access procedure. For example, in FIG. 12, the resource sets 1202 and 1204 for transmission of a random access preamble and the random access preamble groups 1212 and 1214 may be used for transmission of a random access preamble corresponding to the 4 step contention based random access procedure. The method for the terminal apparatus 1 to select a random access preamble group, illustrated in FIG. 14, may be applied to the 4 step contention based random access procedure.

FIG. 18 is a diagram illustrating one example of random access preamble groups for random access procedures according to the present embodiment. In FIG. 18, group configurations for the 4 step contention based random access procedure and the 2 step contention based random access procedure are the same. In FIG. 18, the group 1212A2 includes random access preambles having indexes 6 to 20, the group 1212B2 includes random access preambles having indexes 21 to 41, and the group 1212C2 includes random access preambles having indexes 42 to 63. The terminal apparatus 1 may select one group among the groups {1212A2, 1212B2, 1212C2} in the first step of the 4 step contention based random access procedure, and may select one group among the groups {1212A2, 1212B2, 1212C2} in the first step of the 2 step contention based random access procedure.

FIG. 18 is a diagram illustrating one example of random access preamble groups for random access procedures according to the present embodiment. In FIG. 18, group configurations for the 4 step contention based random access procedure is the same as group configurations for the 2 step contention based random access procedure. In FIG. 18, the group 1212A2 includes random access preambles having indexes 6 to 20, the group 1212B2 includes random access preambles having indexes 21 to 41, and the group 1212C2 includes random access preambles having indexes 42 to 63. The terminal apparatus 1 may select one group among the groups {1212A2, 1212B2, 1212C2} in the first step of the 4 step contention based random access procedure, and may select one group among the groups {1212A2, 1212B2, 1212C2} in the first step of the 2 step contention based random access procedure.

FIG. 19 is a diagram illustrating another example of random access preamble groups for random access procedures according to the present embodiment. In FIG. 19, a group configuration for the 4 step contention based random access procedure is different from a group configuration for the 2 step contention based random access procedure. In FIG. 19, the group 1212A2 includes random access preambles having indexes 6 to 20, the group 1212B2 includes random access preambles having indexes 21 to 63, a group 1212A2' includes random access preambles having indexes 6 to 41, and a group 1212B2' includes random access preambles having indexes 42 to 63. The terminal apparatus 1 may select one group among the groups {1212A2', 1212B2'} in the first step of the 4 step contention based random access procedure, and may select one group among the groups {1212A2, 1212B2} in the first step of the 2 step contention based random access procedure.

The terminal apparatus 1 may select one group among the multiple random access preamble groups {1212A2, 1212B2} based on measurement using a downlink physical signal (a synchronization signal and/or a downlink reference signal), the size of the message X, the value A1 given in accordance with information received from the base station apparatus 3, and/or the value A2 given in accordance with the information received from the base station apparatus 3. The terminal apparatus 1 may select one group among the multiple random access preamble groups {1212A2, 1212B2} based on measurement using a downlink physical signal (a synchronization signal and/or a downlink reference signal), the size of the message X, a value A3 given in accordance with the information received from the base station apparatus 3, and/or a value A4 given in accordance with the information received from the base station apparatus 3. Here, the values A1, A2, A3, and A4 may be configured separately. The base station apparatus 3 may transmit information used to determine the value A1, information used to determine the value A2, information used to determine the value A3, and information used to determine the value A4. Note that the method illustrated in FIG. 14 may be used as a method for determining a group.

In FIG. 18 and FIG. 19, the random access preambles having the indexes 0 to 5 may be used in the non-contention based random access procedure.

Figure 20:
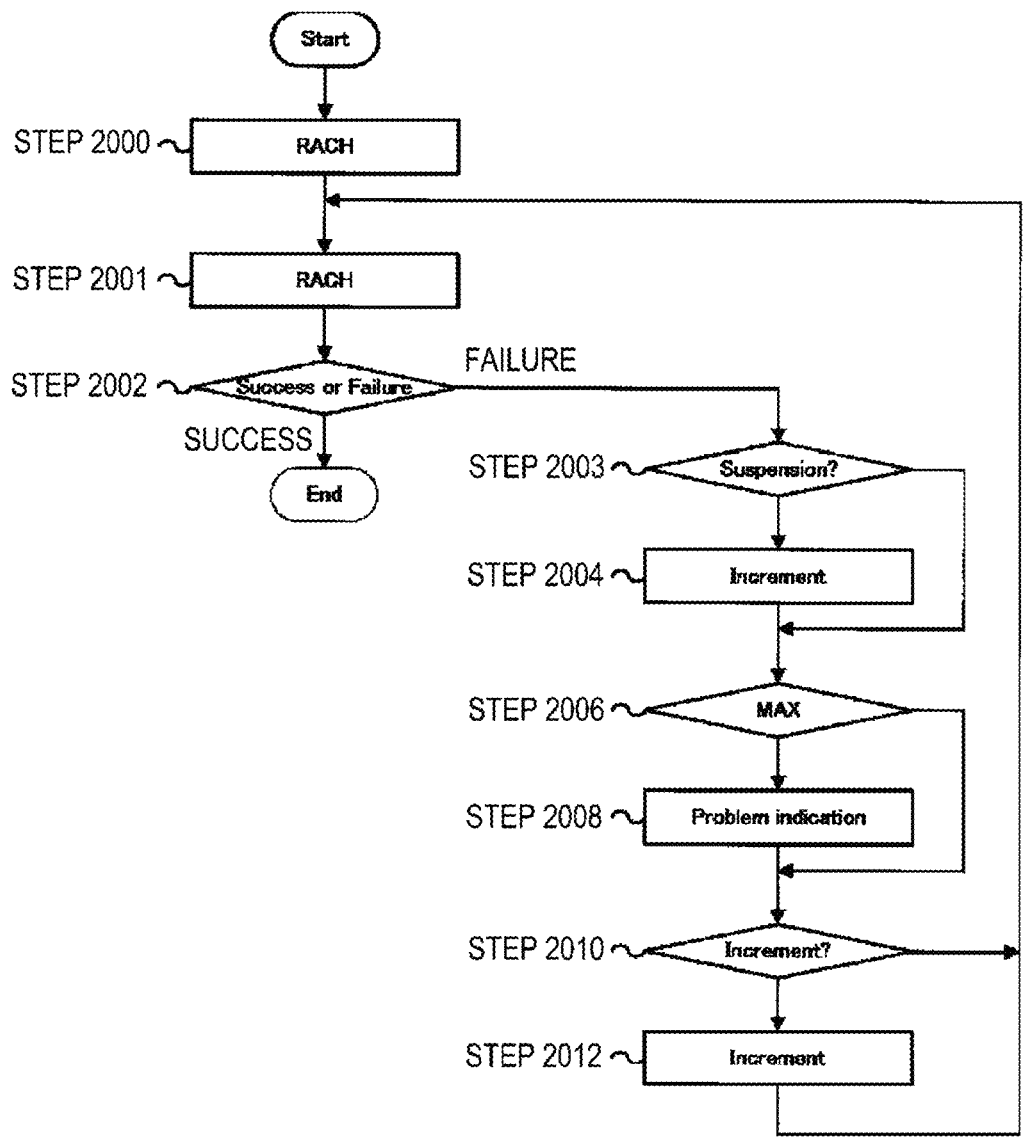
FIG. 20 is a diagram illustrating one example of a flow of a contention based random access procedure according to the present embodiment.

FIG. 20 is a diagram illustrating one example of a flow of a contention based random access procedure according to the present embodiment.

In step 2000, the terminal apparatus 1 sets a transmission counter (PREAMBLE_TRANSMISSION_COUNTER) and a power ramp up counter to 0. The transmission counter (PREAMBLE_TRANSMISSION_COUNTER) is used to determine whether to notify the higher layer (RRC) of a random access problem. The power ramp up counter is used for (1) configuration of a transmit power $P_{PRACH}$ for PRACH transmission in the first step of the 4 step contention based random access procedure, (2) configuration of the transmit power $P_{PRACH}$ for the PRACH transmission in the first step of the 2 step contention based random access procedure, and (3) configuration of the transmit power $P_{PUSCH}$ for the PUSCH transmission in the first step of the 2 step contention based random access procedure.

In step 2001, the terminal apparatus 1 may select a type/form of contention random access procedure (the 2 step contention based random access procedure or the 4 step contention based random access procedure), and perform the contention based random access procedure based on the selected type/form.

In step 2002, the terminal apparatus 1 determines whether random access response reception or contention resolution is successful. In a case that the random access response reception or the contention resolution is successful, the terminal apparatus 1 terminates the contention based random access procedure.

In a case that the random access response reception or the contention resolution fails, the terminal apparatus 1 proceeds to step 2003.

An example of the case in that the random access response reception fails will be described. The MAC of the terminal apparatus 1 may monitor a PDCCH for a random access response in a random access response window in a case that a random access preamble is transmitted (initial transmission or retransmission) in the first step (600) of the 4 step contention based random access procedure. In a case that the random access response is not received in the random access response window, the MAC of the terminal apparatus 1 may proceed to step 2003. In a case that all of the received random access responses do not include a random access identifier corresponding to the transmitted random access preamble, the MAC of the terminal apparatus 1 may proceed to step 2003.

An example of the case in that the random access response reception or the contention resolution fails will be described. In a case that a random access preamble and an identifier of the terminal apparatus 1 are transmitted in the first step (700, 800) of the 2 step contention based random access procedure, the MAC of the terminal apparatus 1 may start a first timer (first mac-ContentionResolutionTimer). Here, the MAC of the terminal apparatus 1 may monitor a PDCCH for contention resolution and a PDCCH for a the random access response while the first timer (first mac-ContentionResolutionTimer) is running. In a case that the identifier of the terminal apparatus 1 is transmitted in the third step (804) of the 2 step contention based random access procedure, the MAC of the terminal apparatus 1 may start a second timer (second mac-ContentionResolutionTimer). Here, the MAC of the terminal apparatus 1 may monitor a PDCCH for contention resolution while the second timer (second mac-ContentionResolutionTimer) is running. In a case that the first timer (first mac-ContentionResolutionTimer) or the second timer (second mac-ContentionResolutionTimer) expires, the MAC of the terminal apparatus 1 may assume that the contention resolution has failed. In a case that the MAC of the terminal apparatus 1 considers that the contention resolution is unsuccessful and the MAC of the terminal apparatus 1 has not received a power ramping suspension notification from the lower layer (physical layer), the MAC of the terminal apparatus 1 may proceed to step 2003. Here, the length of the first timer (first mac-ContentionResolutionTimer) and/or the length of the second timer (second mac-ContentionResolutionTimer) may be given based on higher layer (RRC) information (parameter) received from the base station apparatus 3. Here, the second timer (second mac-ContentionResolutionTimer) may be the first timer (first mac-ContentionResolutionTimer). In this case, the higher layer (RRC) information (parameter) may not indicate the length of the second timer (second mac-ContentionResolutionTimer).

In step 2003, the MAC of the terminal apparatus 1 determines whether the power ramping suspension notification has been received from the lower layer (physical layer). In a case that the power ramping suspension notification has not been received from the lower layer (physical layer), the MAC of the terminal apparatus 1 may increment the transmission counter (PREAMBLE_TRANSMISSION_COUNTER) by one and proceed to step 2006 (step 2004). In a case that the power ramping suspension notification has been received from the lower layer (physical layer), the MAC of the terminal apparatus 1 may proceed to step 2006. Here, a common transmission counter (PREAMBLE_TRANSMISSION_COUNTER) may be used regardless of the selected type/form of random access procedure. In a case that the MAC indicates to the physical layer of the terminal apparatus 1 to transmit the random access preamble but the transmission of the random access preamble is dropped, the physical layer of the terminal apparatus 1 may indicate the power ramping suspension notification to the MAC. In a case that the MAC indicates to the physical layer of the terminal apparatus 1 to transmit the random access preamble and the identifier of the terminal apparatus 1 but the transmission of the random access preamble and the identifier of the terminal apparatus 1 is dropped, the physical layer of the terminal apparatus 1 may indicate the power ramping suspension notification to the MAC. The physical layer of the terminal apparatus 1 may drop transmission of a PUSCH including the identifier of the terminal apparatus 1 based on drop of transmission of a PRACH including the random access preamble.

In step 2006, the MAC of the terminal apparatus 1 may determine whether the transmission counter (PREAMBLE_TRANSMISSION_COUNTER) has a prescribed value A. In a case that the transmission counter (PREAMBLE_TRANSMISSION_COUNTER) does not have the prescribed value A, the MAC of the terminal apparatus 1 may proceed to step 2010. In a case that the transmission counter (PREAMBLE_TRANSMISSION_COUNTER) has the prescribed value A, the MAC of the terminal apparatus 1 may indicate a random access problem to the higher layer (RRC) (step 2008). Based on the indication of the random access problem from the lower layer (MAC), the higher layer (RRC) may consider that a radio link failure is detected and perform a leaving RRC_CONNECTED procedure or an RRC connection re-establishment procedure. In the leaving RRC_CONNECTED procedure and the RRC connection re-establishment procedure, the RRC requires the MAC to reset the MAC. In a case that the reset of the MAC is requested by the higher layer (RRC) of the terminal apparatus 1, the MAC of the terminal apparatus 1 stops the random access procedure which has been continued. Here, the prescribed value A may be the maximum number of transmissions or the maximum number of attempts. Here, the prescribed value A may be given based on the higher layer (RRC) information (parameter) received from the base station apparatus 3.

In a case that the MAC of the terminal apparatus 1 determines that the random access procedure has failed in step 2002, the MAC of the terminal apparatus 1 may determine whether to increment the power ramp up counter by one (step 2010). Note that, in a case that the random access procedure has failed in step 2002 and no power ramping suspension notification has been received from the lower layer (physical layer), the MAC of the terminal apparatus 1 may determine whether to increment the power ramp up counter by one. In other words, in a case that the random access procedure has failed in step 2002 and the power ramping suspension notification has been received from the lower layer (physical layer), the MAC of the terminal apparatus 1 may not determine whether to increment the power ramp up counter by one.

In a case that the MAC of the terminal apparatus 1 determines to increment the power ramp up counter by one, the MAC of the terminal apparatus 1 may increment the power ramp up counter by one (step 2012). After step 2012, the MAC of the terminal apparatus 1 may proceed to step 2001 and perform the selected type/form of contention based random access procedure. In a case that the MAC of the terminal apparatus 1 determines not to increment the power ramp up counter by one, the MAC of the terminal apparatus 1 may proceed to step 2001 and perform the selected type/form of contention based random access procedure.

In step 2010, the MAC of the terminal apparatus 1 may determine whether to increment the power ramp up counter based on the transmission counter (PREAMBLE_TRANS- MISSION_COUNTER). In step 2010, in a case that the remainder of dividing the transmission counter (PREAMBLE_TRANSMISSION_COUNTER) is a prescribed value B, the MAC of the terminal apparatus 1 may determine to increment the power ramp up counter by one. Here, the prescribed value B may be given based on the higher layer (RRC) information (parameter) received from the base station apparatus 3. The prescribed value B may be 1 or an integer greater than 1. The MAC itself of the terminal apparatus 1 may adjust the value of the power ramp up counter such that the power ramp up counter does not exceed the transmission counter (PREAMBLE_TRANSMISSION_COUNTER).

A method of configuring the transmit power $P_{PRACH}$ for transmission of a PRACH including a random access preamble will be described below. The transmit power $P_{PRACH}$ for the transmission of the PRACH may be given by Equation 5.

$$P_{PRACH}=\min\{,PREAMBLE\_RECEIVED\_TARGET\_POWER+\}[dBm] \quad \text{Equation 5}$$

where is the configured UE transmit power defined in [6] for subframe i of serving cell.

is the downlink path loss estimate calculated in the UE for serving cell.

$P_{CMAX,c}(i)$ is a maximum transmit power for a subframe i of a serving cell c, $PL_c$ a downlink path loss (path loss estimate) in the serving cell c and is calculated by the terminal apparatus 1, and min is a function that returns a minimum value among a plurality of input values. PREAMBLE_RECEIVED_TARGET_POWER is given by Equation 6.

$$PREAMBLE\_RECEIVED\_TARGET\_POWER = preambleInitialReceivedTargetPower(m)+DELTA\_PREAMBLE(F)+(PREAMBLE\_TRANSMISSION\_COUNTER-1)*powerRampingStep(m); \quad \text{Equation 6}$$

where preambleInitialReceivedTargetPower(m) is configured by higher layers (RRC) for m=0 and m=1. For 4 step contention based random access procedure and non-contention based random access procedure then m=0, and for 2 step contention based random access procedure then m=1.

powerRampingStep(m) is configured by higher layers (RRC) for m=0 and m=1.

DELTA_PREAMBLE(F) is configured by higher layers (RRC). Each DELTA_PREAMBLE(F) value corresponds to a PRACH format (F).

preambleInitialReceivedTargetPower(m) is configured by the higher layer (RRC), powerRampingStep(m) is a step size of transmit power ramp up, and powerRampingStep(m) is configured by the higher layer (RRC). m is 0 for the 4 step contention based random access response procedure and the non-contention based random access procedure. m is 1 for the 2 step contention based random access procedure. In other words, preambleInitialReceivedTargetPower(0) and preambleInitialReceivedTargetPower(1) may be configured by the higher layer. In other words, powerRampingStep(0) and powerRampingStep(1) are configured by the higher layer. The base station apparatus 3 may transmit higher layer (RRC) information (parameter) for indicating preambleInitialReceivedTargetPower(0) and higher layer (RRC) information (parameter) for indicating preambleInitialReceivedTargetPower(1). The base station apparatus 3 may transmit higher layer (RRC) information (parameter) for indicating powerRampingStep(0) and higher layer (RRC) information (parameter) for indicating powerRampingStep(1).

Common preambleInitialReceivedTargetPower may be used for the 2 step contention based random access response procedure, the 4 step contention based random access response procedure, and the non-contention based random access procedure. Common powerRampingStep may be used for the 2 step contention based random access response procedure, the 4 step contention based random access response procedure, and the non-contention based random access procedure.

DELTA_PREAMBLE (F) may be configured by the higher layer. Each DELTA_PREAMBLE (F) may correspond to a PRACH format (F). The PRACH format may be a random access preamble format. The PRACH format may include a CP length, the length of a random access preamble sequence, and the number of repetitions of the random access preamble sequence. The base station apparatus 3 may transmit higher layer (RRC) information (parameter) for indicating DELTA_PREAMBLE (F).

PREAMBLE_TRANSMISSION_COUNTER is the transmission counter described above.

In other words, the terminal apparatus 1 may ramp up the transmit power for the transmission of the PRACH transmitted in the first step of the 2 step contention based random access procedure, based on a failure of random access response reception or contention resolution. In other words, the terminal apparatus 1 may ramp up the transmit power for the transmission of the PRACH transmitted in the first step of the 4 step contention based random access procedure, based on a failure of random access response reception or contention resolution.

A method of configuring the transmit power $P_{PUSCH}$ for transmission of a PUSCH will be described below.

In a case that an entire transmission bandwidth for the PUSCH transmitted in the first step (700, 800) of the 2 step contention based random access procedure is included in a transmission bandwidth for the PRACH transmitted in the first step (700, 800) of the 2 step contention based random access procedure, the transmit power $P_{PUSCH}$ for the transmission of the PUSCH may be given based on the transmit power $P_{PRACH}$ for the transmission of the PRACH. For example, the transmit power $P_{PUSCH}$ for the transmission of the PUSCH may be the same as the transmit power $P_{PRACH}$ for the transmission of the PRACH.

The transmit power $P_{PUSCH,c}(i)$ for transmission of a PUSCH in the subframe (i) of the serving cell c may be given by Equation 7.

$$P_{PUSCH,c}(i) = \min\begin{cases} P_{CMAX,c}(i), \\ 10\log_{10}(M_{PUSCH,c}(i)) + P_{O\_PUSCH,c} + \alpha_c \cdot \\ PL_c + \Delta_{TF,c}(i) + f_c(i) + \Delta P_{rampup}(2) \end{cases}[dBm] \quad \text{Equation 7}$$

$M_{PUSCH,c}$ is a transmission bandwidth for the PUSCH in the subframe (i) of the serving cell c, and is expressed by the number of physical resource blocks. $P_{O\_PUSCH,c}$ is configured by the higher layer, $\alpha_c$ is configured by the higher layer, $\Delta_{TF,c}(i)$ is given based at least on a higher layer parameter, and $f_c(i)$ is given based on a TPC command included in downlink control information. For the transmit power $P_{PUSCH}$ for the transmission of the PUSCH transmitted in the first step (700, 800) of the 2 step contention based random access procedure, ΔPrampup(2) may be given by Equation 8. Otherwise, $\Delta P_{rampup}(2)$ may be 0.

$$\Delta P_{rampup}(2)=(\text{PREAMBLE\_TRANSMISSION\_COUNTER}-1)*\text{powerRampingStep}(2) \quad \text{Equation 8}$$

powerRampingStep(2) is configured by the higher layer. The base station apparatus 3 may transmit higher layer (RRC) information (parameters) for indicating powerRampingStep(2). powerRampingStep(2) may be defined separately from powerRampingStep(0) and powerRampingStep (1). In Equation 8, powerRampingStep(1) may be used instead of powerRampingStep(2).

PREAMBLE_TRANSMISSION_COUNTER is the transmission counter described above.

In other words, the terminal apparatus 1 may ramp up the transmit power for the transmission of the PUSCH transmitted in the first step of the 2 step contention based random access procedure, based on a failure of the reception of a random access response or contention resolution.

The terminal apparatus 1 may ramp up the transmit power for the transmission of the PUSCH transmitted in the first step of the 2 step contention based random access procedure, based on a failure of random access response reception or contention resolution in the 2 step contention based random access procedure.

The terminal apparatus 1 may ramp up the transmit power for the transmission of the PUSCH transmitted in the first step of the 2 step contention based random access procedure, based on a failure of random access response reception or contention resolution in the 4 step contention based random access procedure.

In a case that a random access response is received as the second step of the 4 step contention based random access procedure, the terminal apparatus 1 may reset the value of $f_c(i)$. Here, an initial value $f_c(0)$ of $f_c(i)$ may be given based on $\Delta P_{rampup}(0)$ and $\delta_{msg2,c}$. $\Delta P_{rampup}(0)$ is given by Equation 9. Here, $\delta_{msg2,c}$ is indicated by a TPC command included in the random access response.

$$\Delta P_{rampup}(0)=(\text{PREAMBLE\_TRANSMISSION\_COUNTER}-1)*\text{powerRampingStep}(0) \quad \text{Equation 9}$$

In a case that a random access response is received as the second step of the 2 step contention based random access procedure, the terminal apparatus 1 may reset the value of $f_c(i)$. Here, the initial value $f_c(0)$ of $f_c(i)$ may be given based on $\Delta P_{rampup}(1)$ and $\delta_{msg2,c}$. $\Delta P_{rampup}(1)$ is given by Equation 10. Here, $\delta_{msg2,c}$ is indicated by a TPC command included in the random access response.

$$\Delta P_{rampup}(1)=(\text{PREAMBLE\_TRANSMISSION\_COUNTER}-1)*\text{powerRampingStep}(1) \quad \text{Equation 10}$$

In a case that a contention resolution is received as the second step of the 2 step contention based random access procedure, the terminal apparatus 1 may reset the value of $f_c(i)$. Here, the initial value $f_c(0)$ of $f_c(i)$ may be given based on $\Delta P_{rampup}(1)$ and $\delta_{msg2,c}$. Here, $\delta_{msg2,c}$ is indicated by a TPC command included in the contention resolution.

In a case that a contention resolution is received as the second step of the 2 step contention based random access procedure, the terminal apparatus 1 may set the value of $f_c(i)$ based on Equation 11. $\Delta P_{rampup\_2step}$ may be given based on $\Delta P_{rampup}(2)$. Here, $\delta_{msg2,c}$ is indicated by a TPC command included in the contention resolution.

$$f_c(i)=f_c(i-1)+\Delta P_{rampup\_2step}+\delta_{msg2,c} \quad \text{Equation 11}$$

Various aspects of the terminal apparatus 1 according to the present embodiment will be described below.

(1) A first aspect of the present embodiment is a terminal apparatus 1 including the higher layer processing unit 14 configured to perform a random access procedure and the reception unit 10 configured to receive a physical channel (PDCCH order), wherein the random access procedure includes a 2 step contention based random access procedure, a 4 step contention based random access procedure, and a non-contention based random access procedure, the physical channel indicates initiation of one of the 4 step-contention based random access procedure and the non-contention based random access procedure, and the higher layer processing unit is configured to initiate one of the 4 step contention based random access procedure and the non-contention based random access procedure based on the physical channel.

(2) In the first aspect of the present embodiment, the higher layer processing unit 14 initiates one of the 2 step contention based random access procedure and the 4 step contention based random access procedure for initial access and RRC connection re-establishment.

(3) In the first aspect of the present embodiment, for handover, the higher layer processing unit 14 initiates one of the 2 step contention based random access procedure, the 4 step contention based random access procedure, and the non-contention based random access procedure.

(4) In the first aspect of the present embodiment, in a case that the MAC layer initiates the random access procedure, the higher layer processing unit 14 initiates one of the 2 step contention based random access procedure and the 4 step contention based random access procedure.

(5) In the first aspect of the present embodiment, in a case that the physical channel indicates initiation of the random access procedure in a secondary cell belonging to a secondary TAG, the physical channel indicates initiation of the non-contention based random access procedure.

(6) A second aspect of the present embodiment is the terminal apparatus 1 including the higher layer processing unit 14 configured to control a 2 step contention based random access procedure, and the transmission unit 10 configured to transmit a random access preamble and data as a first step of the 2 step contention based random access procedure, wherein the data includes information of the random access preamble, and the information of the random access preamble includes part or all of the following information A to information C.

Information A: Information for indicating an index of the random access preamble Information B: Information for indicating a resource for the transmission of the random access preamble Information C: Information related to a sequence of the random access preamble (7) A third aspect of the present embodiment is the base station apparatus 3 including the higher layer processing unit 34 configured to control a 2 step contention based random access procedure, and the reception unit 30 configured to receive a random access preamble and data as a first step of the 2 step contention based random access procedure, wherein the data includes information of the random access preamble.

The information of the random access preamble includes part or all of the following information A to information C.

Information A: Information for indicating an index of the random access preamble Information B: Information for indicating a resource for transmission of the random access preamble Information C: Information related to a sequence of the random access preamble (8) A fourth aspect of the present embodiment is the terminal apparatus 1 including the higher layer processing unit 14 configured to control a 2 step contention based random access procedure, and the transmission unit 10 configured to transmit a random access preamble and data as a first step of the 2 step contention based random access procedure, wherein one or both of (1) a parameter related to initialization of a scrambling sequence used for scrambling of a physical channel including the data and (2) a parameter used for generation of a DeModulation Reference Signal (DMRS) associated with the physical channel including the data is determined based on one or both of (3) an index of the random access preamble and (4) a resource for transmission of the random access preamble.

(9) A fifth aspect of the present embodiment is the base station apparatus 3 including the higher layer processing unit 34 configured to control a 2 step contention based random access procedure, and the reception unit 30 configured to receive a random access preamble and data as a first step of the 2 step contention based random access procedure, wherein one or both of (1) a scrambling sequence used for scrambling of a physical channel including the data and (2) a parameter used for generation of a demodulation reference signal associated with the physical channel including the data is determined based on one or both of (3) an index of the random access preamble and (4) a resource for transmission of the random access preamble.

(10) A sixth aspect of the present embodiment is the terminal apparatus 1 including the higher layer processing unit 14 configured to control a 2 step contention based random access procedure, and the transmission unit 10 configured to transmit a random access preamble and data as a first step of the 2 step contention based random access procedure, wherein the higher layer processing unit 14 (1) selects one group of multiple random access preamble groups, (2) selects the random access preamble from the selected group, and (3) selects, from multiple transmission parameters, a transmission parameter corresponding to the selected group, and the data is transmitted based on the selected transmission parameter.

(11) A seventh aspect of the present embodiment is the terminal apparatus 1 including the higher layer processing unit 14 configured to increment a transmission counter based on a failure of random access response reception or contention resolution, the receiver 10 configured to receive information for indicating a higher layer parameter powerRampingStep(1) and information for indicating a higher layer parameter powerRampingStep(2), and a transmit power control unit 12 configured to set a transmit power, wherein the transmit power for PRACH transmission in a first step of a 2 step contention based random access procedure is given based at least on the transmission counter and the higher layer parameter powerRampingStep(1), and the transmit power for PUSCH transmission in the first step of the 2 step contention based random access procedure is given based at least on the transmission counter and the higher layer parameter powerRampingStep(2).

In the second to fifth aspects of the present embodiment, the data may be the message X. In the third and fourth aspects of the present embodiment, the parameter related to initialization of a scrambling sequence used for scrambling of a physical channel including the data may be the parameter D4 related to initialization of a scrambling sequence used for scrambling of coded bits or modulation symbols of the message X. In the third and fourth aspects of the present embodiment, the parameter used for generation of a demodulation reference signal associated with the physical channel including the data may be the parameter D6 related to a DMRS associated with transmission of a PUSCH including the message X. In the sixth aspect of the present embodiment, the transmission parameters may include the parameters D1 to D7 described above, and may include parameters other than the parameters D1 to D7.

Consequently, the terminal apparatus and the base station apparatus can efficiently perform a random access procedure with each other.

The base station apparatus 3 according to one aspect of the present invention can also be realized as an aggregation (an apparatus group) including multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all portions of the functions of a node higher than an eNodeB.

A program running on an apparatus according to one aspect of the present invention may serve as a program that controls a Central Processing Unit (CPU) and the like to cause a computer to operate in such a manner as to realize the functions of the above-described embodiment according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In such a case, a program for realizing such control functions may be recorded on a computer-readable recording medium to cause a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may be constituted of a digital circuit, or may be constituted of an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal device comprising:
control circuitry configured to control a 2-step contention based random-access procedure and a 4-step contention based random-access procedure; and
transmission circuitry configured to transmit a physical random access channel with a random access preamble in a first step of the 2-step contention based random-access procedure or in a first step of the 4-step contention based random-access procedure; wherein
transmission power for the physical random access channel is given at least based on a PREAMBLE_RECEIVED_TARGET_POWER;
for the 4-step contention based random access procedure, the PREAMBLE_RECEIVED_TARGET_POWER is given based at least on a preambleInitialReceivedTargetPower(0) and a powerRampingStep(0); and
for the 2-step contention based random access procedure, the PREAMBLE_RECEIVED_TARGET_POWER is given based at least on a preambleInitialReceivedTargetPower(1) and a powerRampingStep(1).

2. The terminal device according to claim 1, wherein the preambleInitialReceivedTargetPower(0) and the preambleInitialReceivedTargetPower(1) and the powerRampingStep(0) and the powerRampingStep(1) are given by radio resource control information.

3. The terminal device according to claim 1, wherein the powerRampingStep(0) is a step size for power ramping up for the PREAMBLE_RECEIVED_TARGET_POWER for the 4-step contention based random access procedure, and
the powerRampingStep(1) is a step size for power ramping up for the PREAMBLE_RECEIVED_TARGET_POWER for the 2-step contention based random access procedure.

4. A base station device comprising:
control circuitry configured to control a 2-step contention based random-access procedure and a 4-step contention based random-access procedure; and
reception circuitry configured to receive a physical random access channel with a random access preamble in a first step of the 2-step contention based random-access procedure or in a first step of the 4-step contention based random-access procedure; wherein
transmission power for the physical random access channel is given based at least on a PREAMBLE_RECEIVED_TARGET_POWER;
for the 4-step contention based random access procedure, the PREAMBLE_RECEIVED_TARGET_POWER is given based at least on a preambleInitialReceivedTargetPower(0) and a powerRampingStep(0); and
for the 2-step contention based random access procedure, the PREAMBLE_RECEIVED_TARGET_POWER is given based at least on a preambleInitialReceivedTargetPower(1) and a powerRampingStep(1).

5. The base station device according to claim 4, wherein the preambleInitialReceivedTargetPower(0) and the preambleInitialReceivedTargetPower(1) and the powerRampingStep(0) and the powerRampingStep(1) are given by radio resource control information.

6. The base station device according to claim 4, wherein
- the powerRampingStep(0) is a step size for power ramping up for the PREAMBLE_RECEIVED_TARGET_POWER for the 4-step contention based random access procedure, and
- the powerRampingStep(1) is a step size for power ramping up for the PREAMBLE_RECEIVED_TARGET_POWER for the 2-step contention based random access procedure.

7. A communication method used for a terminal device comprising:
- controlling a 2-step contention based random-access procedure and a 4-step contention based random-access procedure; and
- transmitting a physical random access channel with a random access preamble in a first step of the 2-step contention based random-access procedure or in a first step of the 4-step contention based random-access procedure; wherein
- transmission power for the physical random access channel is given based at least on a PREAMBLE_RECEIVED_TARGET_POWER;
- for the 4-step contention based random access procedure, the PREAMBLE_RECEIVED_TARGET_POWER is given based at least on a preambleInitialReceivedTargetPower(0) and a powerRampingStep(0); and
- for the 2-step contention based random access procedure, the PREAMBLE_RECEIVED_TARGET_POWER is given based at least on a preambleInitialReceivedTargetPower(1) and a powerRampingStep(1).

8. A communication method used for a base station device comprising:
- controlling a 2-step contention based random-access procedure and a 4-step contention based random-access procedure; and
- receiving a physical random access channel with a random access preamble in a first step of the 2-step contention based random-access procedure or in a first step of the 4-step contention based random-access procedure; wherein
- transmission power for the physical random access channel is given based at least on a PREAMBLE_RECEIVED_TARGET_POWER;
- for the 4-step contention based random access procedure, the PREAMBLE_RECEIVED_TARGET_POWER is given based at least on a preambleInitialReceivedTargetPower(0) and a powerRampingStep(0); and
- for the 2-step contention based random access procedure, the PREAMBLE_RECEIVED_TARGET_POWER is given based at least on a preambleInitialReceivedTargetPower(1) and a powerRampingStep(1).

* * * * *

(12) INTER PARTES REVIEW CERTIFICATE (4231st)
United States Patent
Suzuki et al.

(10) Number: US 10,932,207 K1
(45) Certificate Issued: Jan. 2, 2026

(54) TERMINAL APPARATUS, BASE STATION APPARATUS, COMMUNICATION METHOD, AND INTEGRATED CIRCUIT

(71) Applicants: Shoichi Suzuki; Wataru Ouchi; Tomoki Yoshimura; Liqing Liu

(72) Inventors: Shoichi Suzuki; Wataru Ouchi; Tomoki Yoshimura; Liqing Liu

(73) Assignee: DAINGEAN TECHNOLOGIES LTD.

Trial Number:

IPR2024-00310 filed Mar. 5, 2024

Inter Partes Review Certificate for:

Patent No.: 10,932,207
Issued: Feb. 23, 2021
Appl. No.: 16/484,565
Filed: Aug. 8, 2019

The results of IPR2024-00310 are reflected in this inter partes review certificate under 35 U.S.C. 318(b).

INTER PARTES REVIEW CERTIFICATE
U.S. Patent 10,932,207 K1
Trial No. IPR2024-00310
Certificate Issued Jan. 2, 2026

AS A RESULT OF THE INTER PARTES REVIEW PROCEEDING, IT HAS BEEN DETERMINED THAT:

Claims 4-6 and 8 are cancelled.

* * * * *